United States Patent
Maegawa et al.

(10) Patent No.: US 10,432,454 B2
(45) Date of Patent: Oct. 1, 2019

(54) ELECTRONIC DEVICE, SERVER, ELECTRONIC DEVICE CONTROLLING METHOD, INFORMATION PROCESSING METHOD AND RECORDING MEDIUM

(71) Applicant: SONY CORPORATION, Tokyo (JP)

(72) Inventors: Hirotoshi Maegawa, Tokyo (JP); Tooru Hiraga, Tokyo (JP)

(73) Assignee: SONY CORPORATION, Tokyo (JP)

( * ) Notice: Subject to any disclaimer, the term of this patent is extended or adjusted under 35 U.S.C. 154(b) by 340 days.

(21) Appl. No.: 14/909,398

(22) PCT Filed: Jul. 24, 2014

(86) PCT No.: PCT/JP2014/003919
§ 371 (c)(1),
(2) Date: Feb. 1, 2016

(87) PCT Pub. No.: WO2015/019568
PCT Pub. Date: Feb. 12, 2015

(65) Prior Publication Data
US 2016/0149757 A1    May 26, 2016

(30) Foreign Application Priority Data
Aug. 9, 2013   (JP) .................................. 2013-166684

(51) Int. Cl.
G06F 15/16    (2006.01)
H04L 12/24    (2006.01)
G06F 9/4401   (2018.01)

(52) U.S. Cl.
CPC ........ *H04L 41/0803* (2013.01); *G06F 9/4411* (2013.01); *H04L 41/12* (2013.01)

(58) Field of Classification Search
USPC ................ 709/217, 202, 220, 223, 224, 249
See application file for complete search history.

(56) References Cited

U.S. PATENT DOCUMENTS

| 9,729,516 B2* | 8/2017 | Dolan ................. H04L 63/0428 |
| 9,730,176 B2* | 8/2017 | Starsinic ............... H04W 60/04 |
| 2005/0101309 A1 | 5/2005 | Croome |
| 2005/0154787 A1 | 7/2005 | Cochran et al. |

(Continued)

FOREIGN PATENT DOCUMENTS

| JP | 2007-179255 A | 7/2007 |
| JP | 2008-009645 A | 1/2008 |

(Continued)

OTHER PUBLICATIONS

Office Action for JP Patent Application No. 2013-166684, dated Aug. 29, 2017, 04 pages of Office Action and 05 pages of English Translation.

(Continued)

*Primary Examiner* — Lan Dai T Truong
(74) *Attorney, Agent, or Firm* — Chip Law Group

(57) ABSTRACT

There is provided an electronic device connected to a network, including a transmission unit which transmits device identification information of the electronic device and at least one other electronic device to a server over the network, a reception unit which receives association operation programs for the electronic device and the at least one other electronic device from the server over the network, and a control unit which controls the electronic device according to the association operation program.

30 Claims, 11 Drawing Sheets

(56) References Cited

U.S. PATENT DOCUMENTS

| | | | |
|---|---|---|---|
| 2005/0166266 A1* | 7/2005 | Taniguchi | H04L 67/34 |
| | | | 726/21 |
| 2005/0198650 A1* | 9/2005 | Ford | G06F 9/4411 |
| | | | 719/321 |
| 2006/0095367 A1* | 5/2006 | Iverson | G06Q 10/087 |
| | | | 705/39 |
| 2010/0015919 A1* | 1/2010 | Tian | H04W 12/06 |
| | | | 455/41.2 |
| 2010/0325202 A1 | 12/2010 | Rehtijarvi | |
| 2012/0284702 A1* | 11/2012 | Ganapathy | G06F 9/468 |
| | | | 717/174 |
| 2013/0136301 A1* | 5/2013 | Abrahamsson | G06K 9/00 |
| | | | 382/103 |
| 2013/0225086 A1* | 8/2013 | Hsu | H04M 1/7253 |
| | | | 455/41.3 |
| 2013/0262571 A1* | 10/2013 | Aibara | H04L 67/42 |
| | | | 709/203 |
| 2015/0019553 A1* | 1/2015 | Shaashua | H04W 4/70 |
| | | | 707/737 |
| 2015/0229636 A1* | 8/2015 | Scavo | H04L 29/06 |
| | | | 726/8 |
| 2017/0242741 A1* | 8/2017 | Huang | G06F 11/079 |
| 2017/0364218 A1* | 12/2017 | Thorsander | G06F 3/04883 |

FOREIGN PATENT DOCUMENTS

| | | |
|---|---|---|
| JP | 2009-129198 A | 6/2009 |
| JP | 2010-218119 A | 9/2010 |
| JP | 2011-211513 A | 10/2011 |
| JP | 2013-054497 A | 3/2013 |

OTHER PUBLICATIONS

Office Action for JP Patent Application No. 2013-166684, dated Jan. 10, 2017, 5 pages and 4 pages English translation.

* cited by examiner

[Fig. 1]
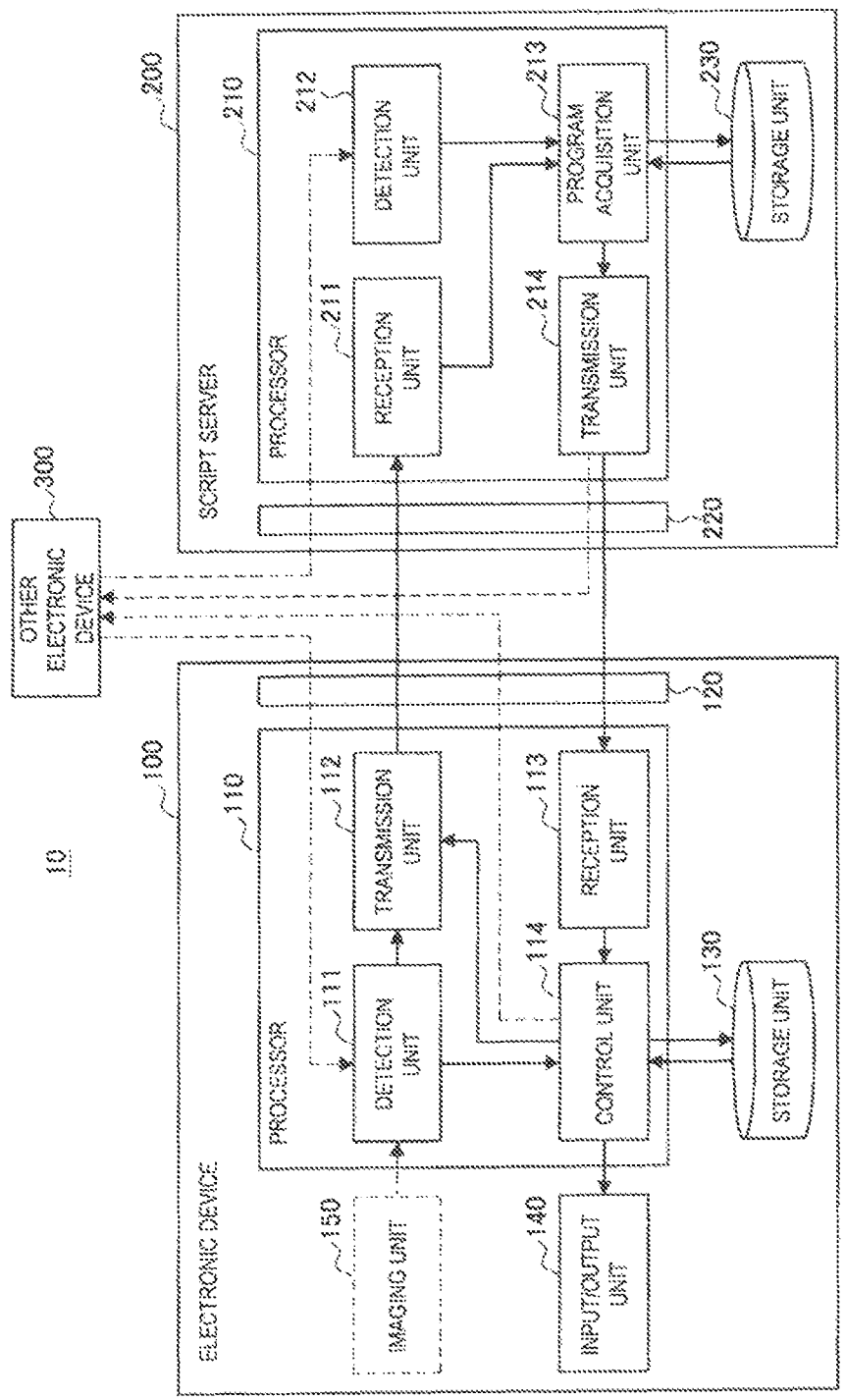

[Fig. 2]
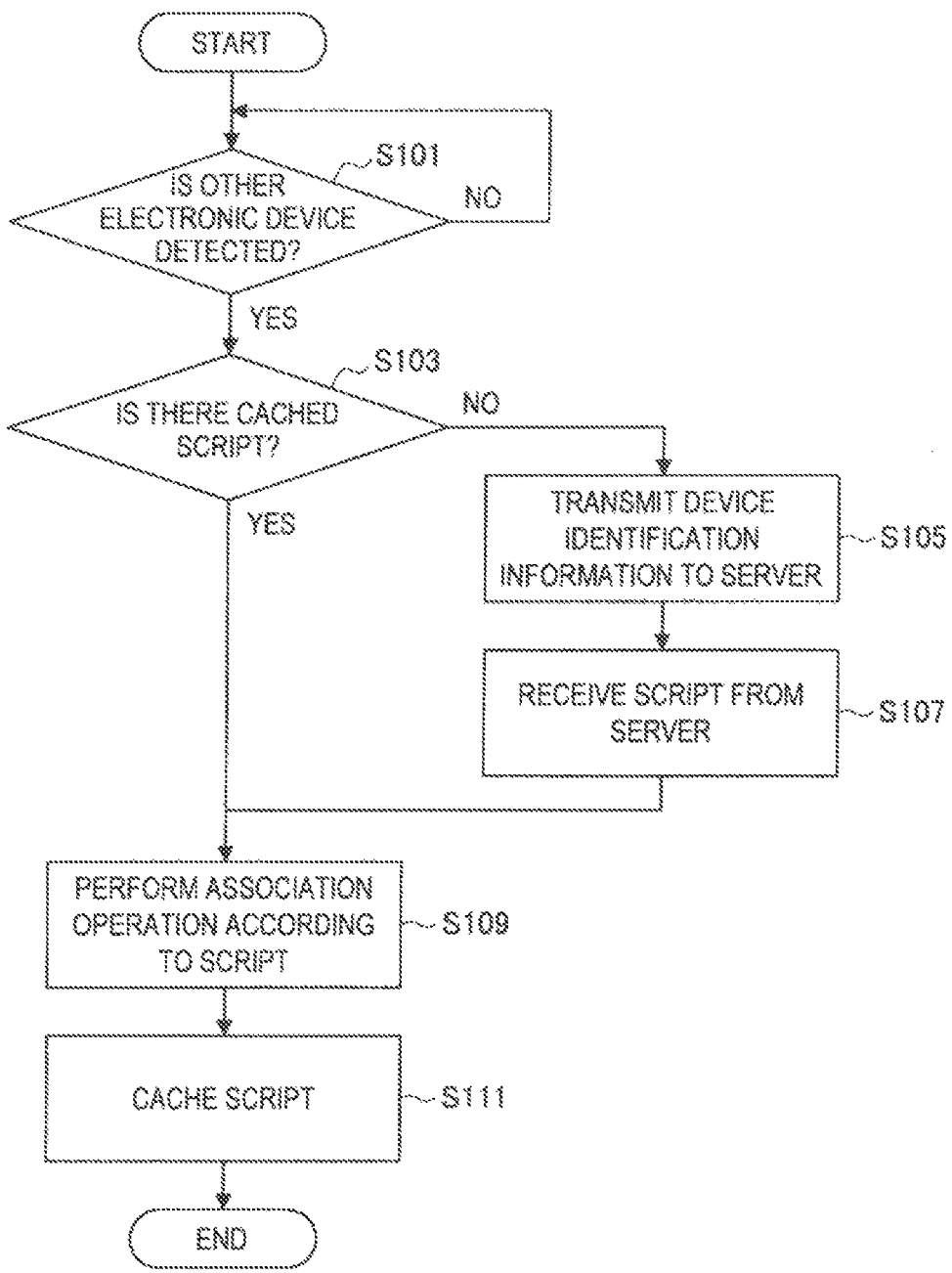

[Fig. 3]
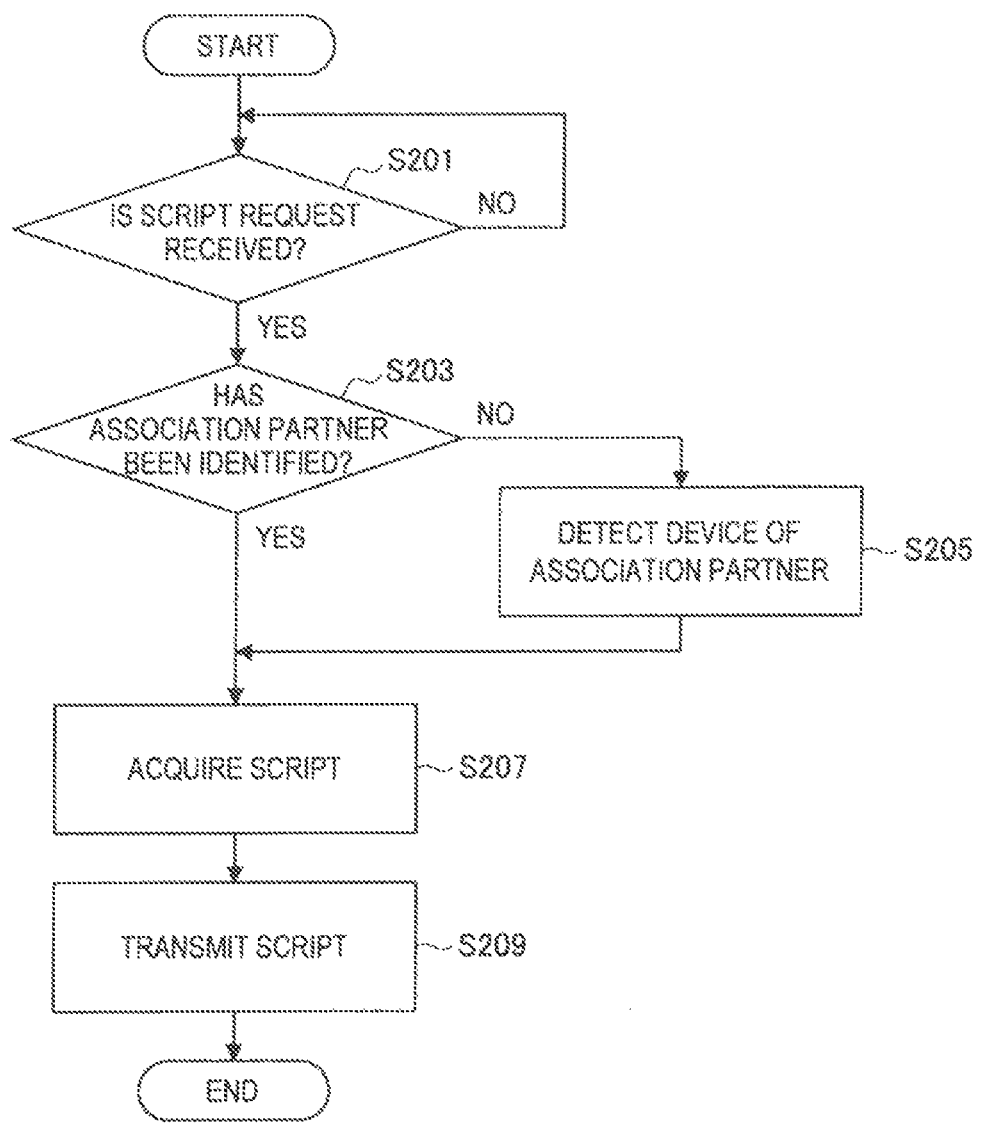

[Fig. 4]
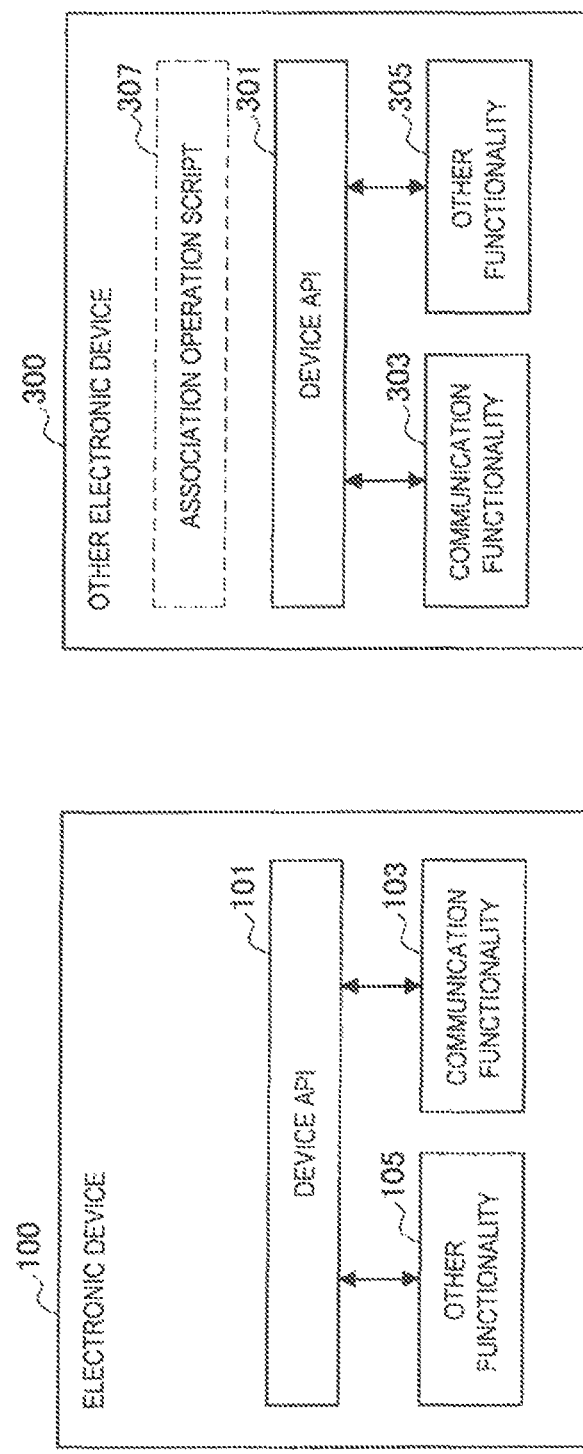

[Fig. 5]
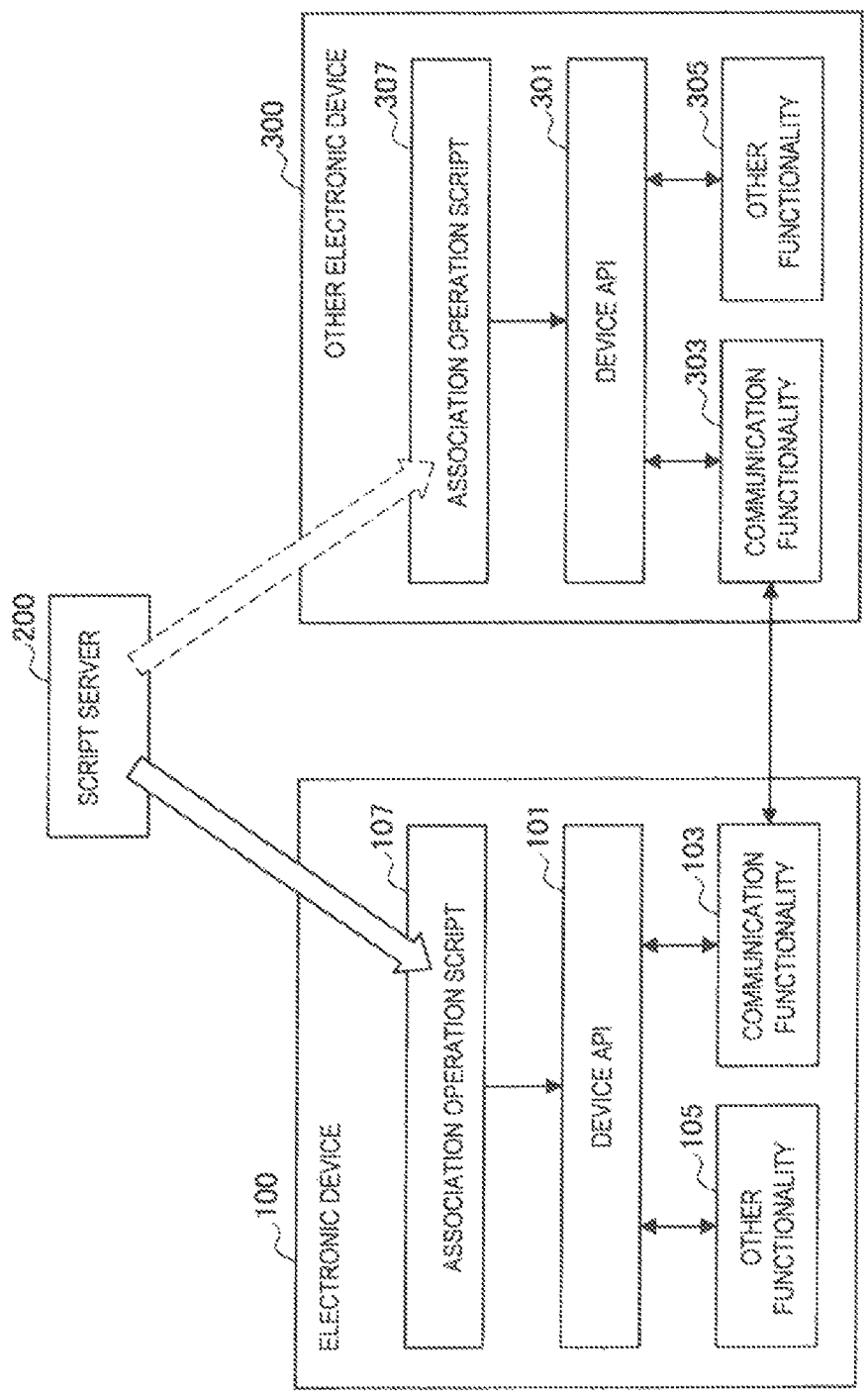

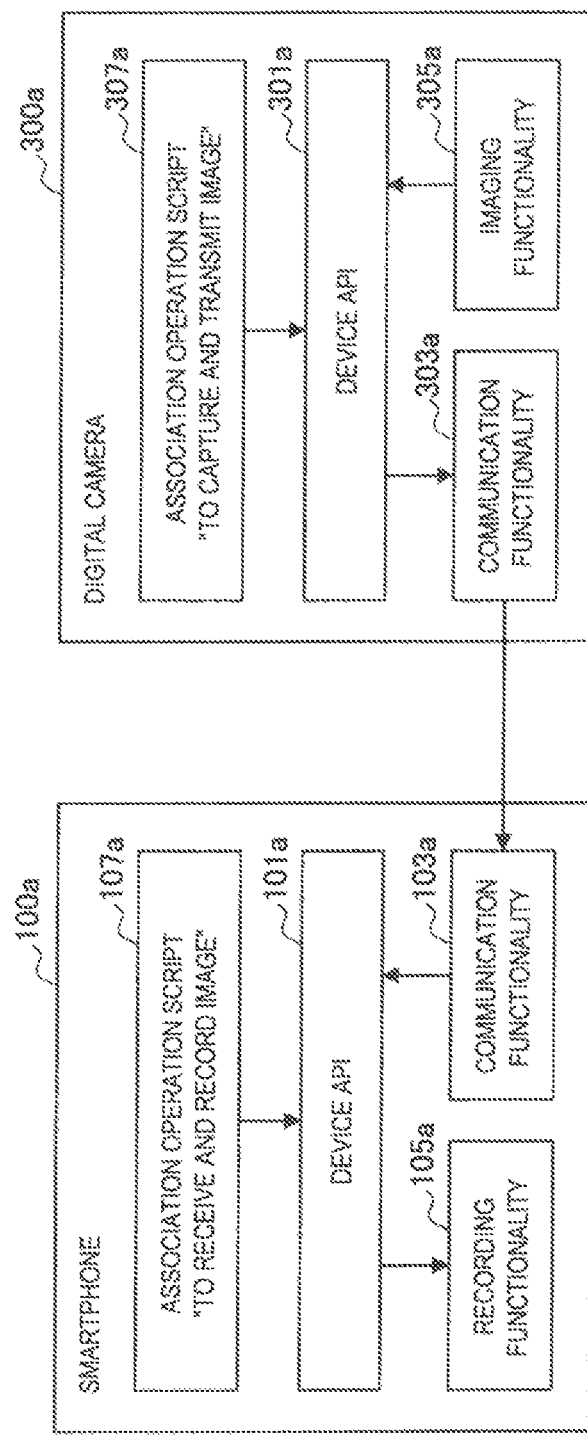
[Fig. 6]

[Fig. 7]
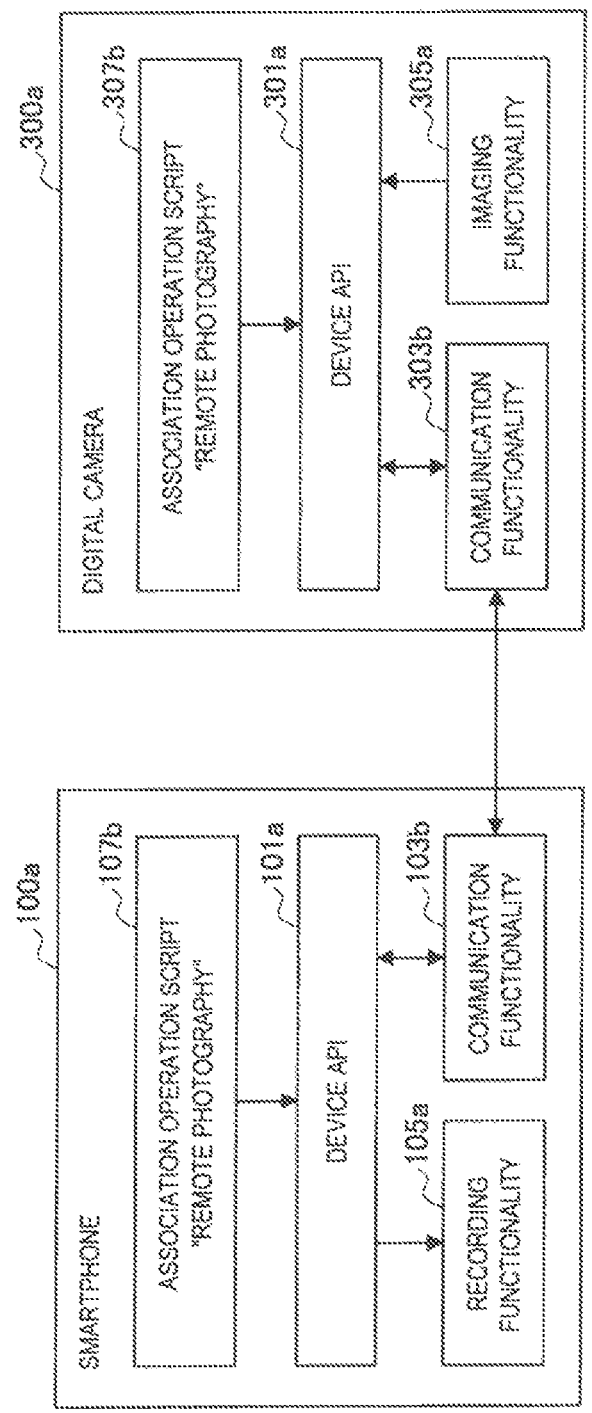

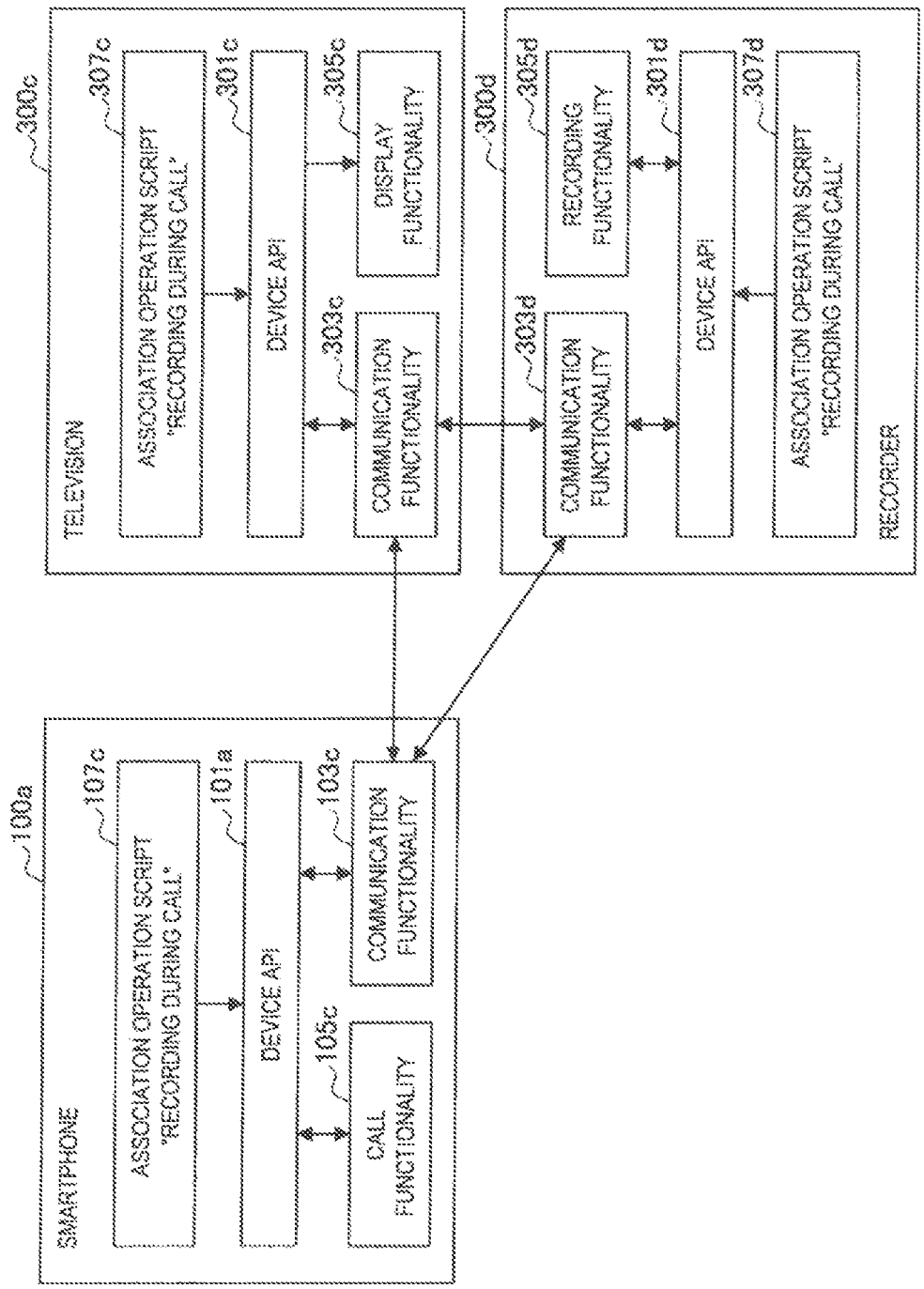
[Fig. 8]

[Fig. 9]
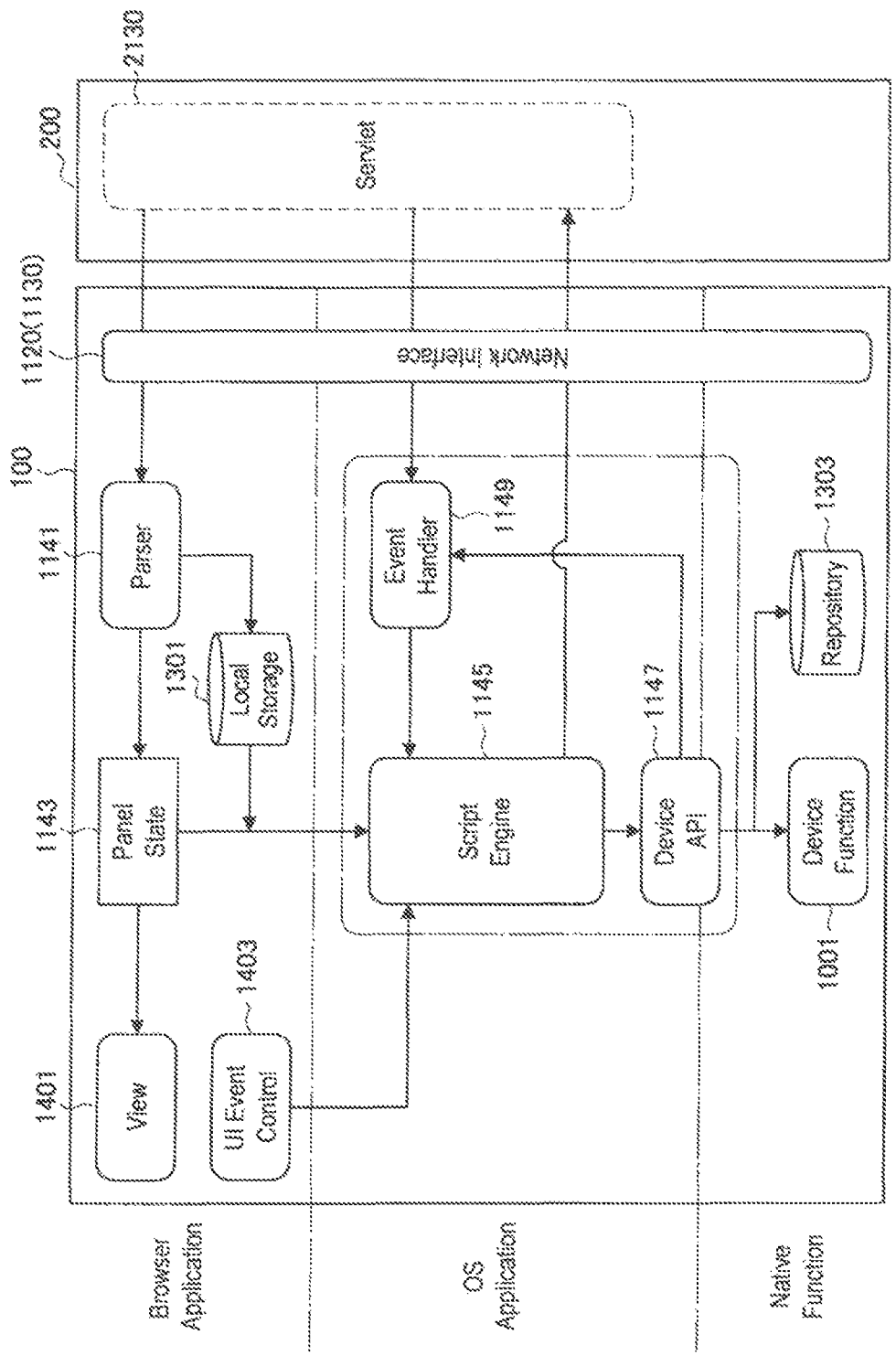

[Fig. 10]
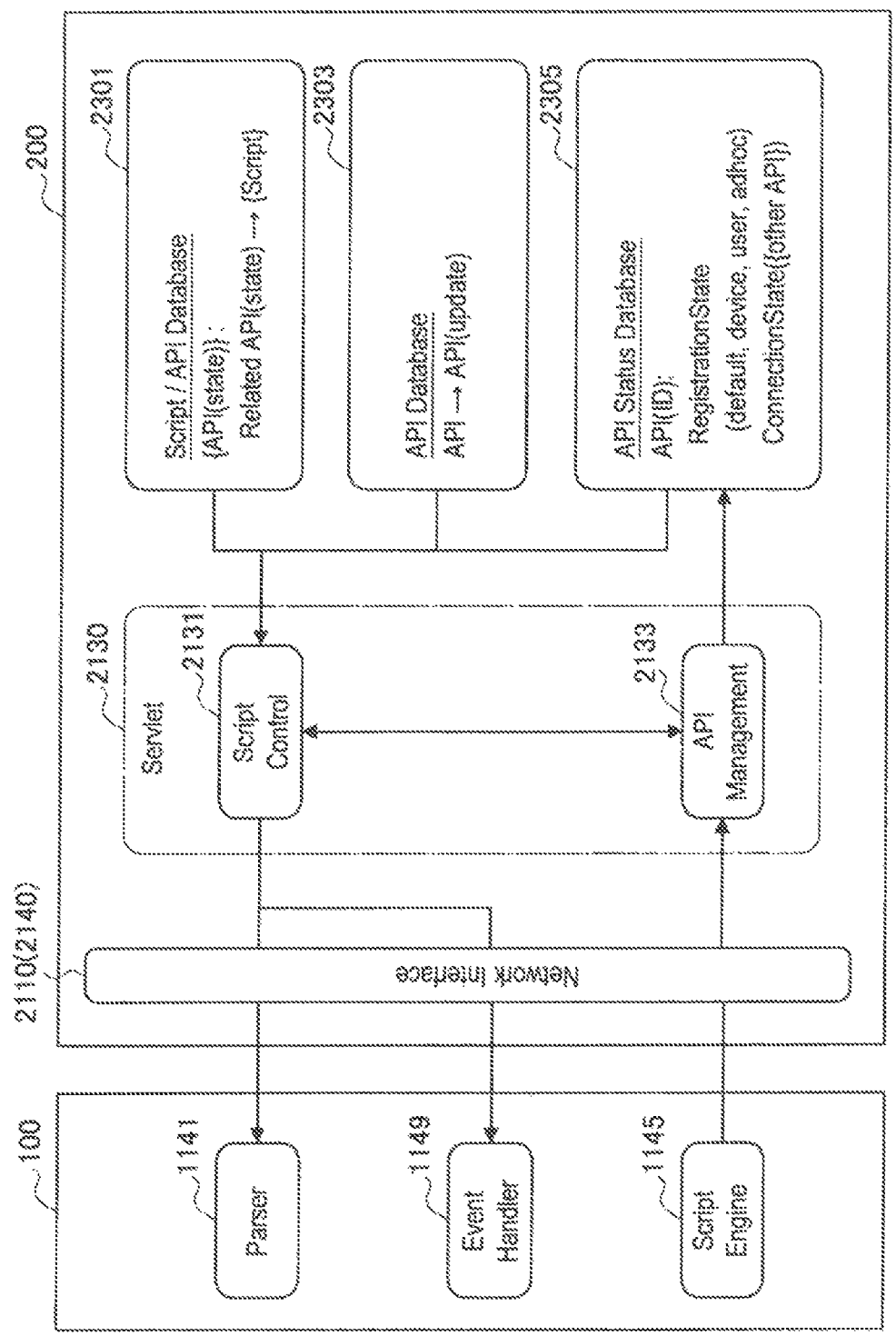

[Fig. 11]
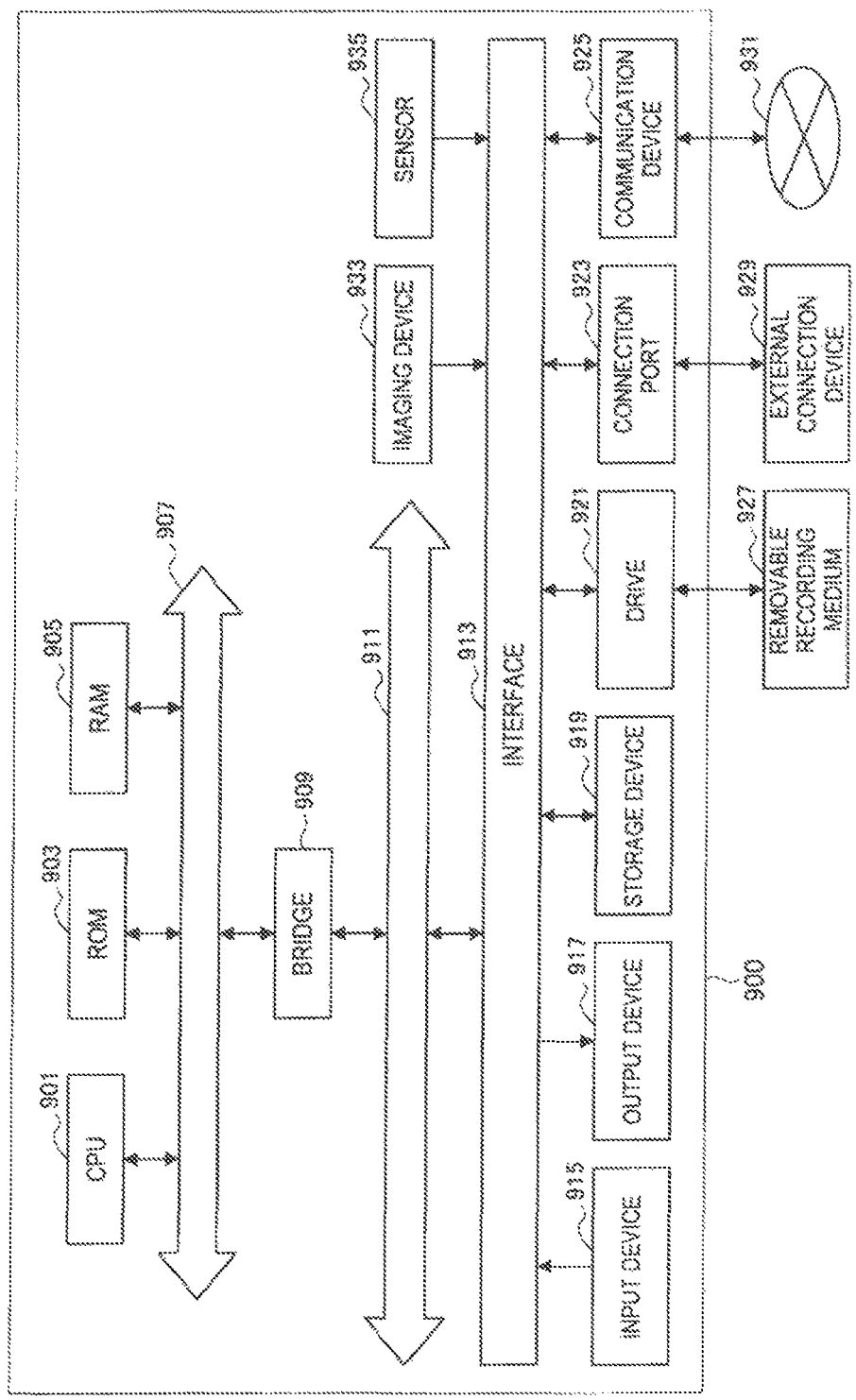

ELECTRONIC DEVICE, SERVER, ELECTRONIC DEVICE CONTROLLING METHOD, INFORMATION PROCESSING METHOD AND RECORDING MEDIUM

CROSS REFERENCE TO RELATED APPLICATIONS

This application claims the benefit of Japanese Priority Patent Application JP 2013-166684 filed Aug. 9, 2013, the entire contents of which are incorporated herein by reference.

TECHNICAL FIELD

The present disclosure relates to an electronic device, a server, an electronic device controlling method, an information processing method and a recording medium.

BACKGROUND ART

As various types of electronic devices spread, cases in which electronic devices can operate in association with each other are increasing. However, since a communication or control mechanism is often different among the devices except for some devices originally designed to be used in association with a specific device, the association itself is difficult or it is necessary for a user to execute a complicated procedure for the association. Therefore, for example, a technology for enabling association with another device according to a simple procedure using an original functionality of the device has been proposed.

For example, a communication device connected to a content reproduction device via a USB or the like, which is a communication device which is recognized as a storage device by a reproduction device, converts a file access command issued by the reproduction device according to information associated with content into a control command of the other device according to a previously set rule, and transmits the command to the other device through wireless communication is described in Patent Literature 1. Accordingly control of the other device in conjunction with reproduction of the content can be realized while using a functionality of issuing the file access command that the reproduction device originally has.

CITATION LIST

Patent Literature

[PTL 1] JP 2007-179255A

SUMMARY

Technical Problem

However, in the technology described in Patent Literature 1 described above, it is also necessary for the rule of converting the file access command into a control command of the other device to be stored in the communication device in advance. When devices serving as control targets are different, it is necessary for different rules of converting the file access command into different types of control commands to be stored. Thus, in a method of converting a command according to a previously stored rule, for example, rules corresponding to the number of combinations of devices are stored or a device for conversion is prepared. As a result, it is not easy for the devices to be freely associated with each other.

Therefore, an electronic device, a server, a method of controlling the electronic device, an information processing method, and a recording medium which are new and improved and enable devices to be freely associated with each other according to a simple procedure are proposed in this disclosure.

Solution to Problem

According to an embodiment of the present disclosure, there is provided an electronic device connected to a network, including a transmission unit which transmits device identification information of the electronic device and at least one other electronic device to a server over the network, a reception unit which receives association operation programs for the electronic device and the at least one other electronic device from the server over the network, and a control unit which controls the electronic device according to the association operation program.

According to an embodiment of the present disclosure, there is provided a server including a reception unit which receives device identification information of a first electronic device from the first electronic device over a network, a program acquisition unit which acquires association operation programs for the first electronic device and at least one second electronic device different from the first electronic device, and a transmission unit which transmits the association operation programs to the first electronic device over the network.

According to an embodiment of the present disclosure, there is provided a method of controlling an electronic device connected to a network, the method including transmitting device identification information of the electronic device and at least one other electronic device to a server over the network, receiving association operation programs for the electronic device and the at least one other electronic device from the server over the network, and controlling, by a processor, the electronic device according to the association operation program.

According to an embodiment of the present disclosure, there is provided an information processing method, including receiving device identification information of a first electronic device from the first electronic device over a network, acquiring, by a processor, association operation programs for the first electronic device and at least one second electronic device different from the first electronic device, and transmitting the association operation programs to the first electronic device over the network.

According to an embodiment of the present disclosure, there is provided a non-transitory computer-readable recording medium having a program recorded thereon to cause a processor included in an electronic device connected to a network to realize functionalities of transmitting device identification information of the electronic device and at least one other electronic device to a server over the network, receiving association operation programs for the electronic device and the at least one other electronic device from the server over the network, and controlling the electronic device according to the association operation program.

According to an embodiment of the present disclosure, there is provided a non-transitory computer-readable recording medium having a program recorded thereon to cause a processor included in one or a plurality of information processing devices constituting a server to realize functionalities of receiving device identification information of a first electronic device from the first electronic device over a network, acquiring association operation programs for the first electronic device and at least one second electronic device different from the first electronic device, and transmitting the association operation programs to the first electronic device over the network.

Advantageous Effects of Invention

As described above, according to this disclosure, it is possible to freely associate devices with each other according to a simple procedure.

BRIEF DESCRIPTION OF DRAWINGS

FIG. 1 is a block diagram illustrating a schematic functional configuration of a system according to one embodiment of this disclosure.

FIG. 2 is a flowchart illustrating an example of a process of an electronic device according to one embodiment of this disclosure.

FIG. 3 is a flowchart illustrating an example of a process of a script server according to one embodiment of this disclosure.

FIG. 4 is a diagram illustrating a functionality of an association operation script in one embodiment of this disclosure.

FIG. 5 is a diagram illustrating a functionality of the association operation script in one embodiment of this disclosure.

FIG. 6 is a diagram illustrating a first specific example of the association operation in one embodiment of this disclosure.

FIG. 7 is a diagram illustrating a second specific example of the association operation in one embodiment of this disclosure.

FIG. 8 is a diagram illustrating a third specific example of the association operation in one embodiment of this disclosure.

FIG. 9 is a diagram illustrating an implementation example of the electronic device in one embodiment of this disclosure.

FIG. 10 is a diagram illustrating an implementation example of the script server in one embodiment of this disclosure.

FIG. 11 is a block diagram illustrating a hardware configuration of an information processing device according to an embodiment of this disclosure.

DESCRIPTION OF EMBODIMENTS

Hereinafter, preferred embodiments of this disclosure will be described in detail with reference to the accompanying drawings. Further, in the present specification and drawings, components having substantially the same functional configuration are denoted with the same reference signs and a repeated description thereof is omitted.

Further, a description will be given in the following order.
1. System configuration
1-1 Functional configuration
1-2 Process flow
2. Mechanism and specific example of association operation
2-1 Mechanism of association operation
2-2 Specific example of association operation
3. Implementation examples
3-1 Client implementation example
3-2 Server implementation example
4. Hardware configuration
5. Supplement 1. System Configuration First, a configuration of a system according to one embodiment of this disclosure will be described with reference to FIGS. 1 to 3.
(1-1. Functional Configuration)
FIG. 1 is a block diagram illustrating a schematic functional configuration of a system according to one embodiment of this disclosure. Referring to FIG. 1, a system 10 according to one embodiment of this disclosure includes an electronic device 100 and a script server 200. The system 10 may include the other electronic device 300. Further, the other electronic device 300 may not be necessarily included in the system 10. The electronic device 100, the script server 200 and the other electronic device 300 are all electronic devices which can execute information processing with a processor, and can be realized by, for example, a hardware configuration of an information processing device, which will be described below. The electronic device 100 and the script server 200 are both connected to a network, and can communicate with each other. Further, the other electronic device 300 may be connected to the network common to the electronic device 100, the script server 200 and the other electronic device 300 or can communicate with the electronic device 100 and/or the script server 200 through a separate communication device, as will be described below.
(Electronic Device)

The electronic device 100 is any device manipulated by a user, and may be, for example, any device having an information processing functionality and a network communication functionality, such as a mobile phone (smartphone), a PC (Personal Computer), a television, a recorder, a game console, or a media player. The electronic device 100 includes a processor 110, a communication unit 120, a storage unit 130, an input/output unit 140, and an imaging unit 150. In a hardware configuration example, the processor 110 may be realized by a CPU, a ROM, a RAM and the like. The communication unit 120 may be realized by a communication device. The storage unit 130 may be realized by, for example, a storage device and/or a removable storage medium. The input/output unit 140 may be realized by an input device and an output device. The imaging unit 150 may be realized by an imaging device.

The processor 110 may realize functionalities of a detection unit 111, a transmission unit 112, a reception unit 113 and a control unit 114 by operating according to a program. The processor 110 may also realize various functionalities for entire control of the electronic device 100, but the functionalities are different according to devices and are well known to a person skilled in the art. Therefore, a description of the functionalities is omitted. Hereinafter, each of the functionalities will be further described.

The detection unit 111 detects at least one other electronic device 300. Here, the other electronic device 300 is a device which becomes a target of an association operation of the electronic device 100. In other words, the detection unit 111 may be said to detect that the other electronic device 300 becomes a target of the association operation of the electronic device using any method. Further the detection unit 111 may not be realized by the processor 110, for example, when the other electronic device 300 is detected by the script server 200 as will be described below or device identification information of the other electronic device 300 is input by a user manipulation which is acquired through the input/output unit 140.

More specifically, for example, the detection unit 111 detects the other electronic device 300 when the electronic device 100 and the other electronic device 300 are close to each other. For example, the electronic device 100 and the other electronic device 300 may be detected to be close to each other, for example, by short distance communication such as NFC (Near Field Communication), Bluetooth (registered trademark), or infrared communication being executed between the communication unit 120 of the electronic device 100 and the other electronic device 300.

Further, the electronic device 100 and the other electronic device 300 may also be detected to be close based on real positions of the respective devices detected by the GPS (Global Positioning System) or the like or positions on the network recognized by communication status of the respective devices. For example, when proximity is detected based on the real positions and when an inter-device distance shown by respective positional information of the electronic device 100 and the other electronic device 300 is smaller than a threshold, the detection unit 111 may determine that these devices are close to each other. Further, for example, when the proximity is detected based on the positions on the network, the detection unit 111 may determine that these devices are close to each other when the electronic device 100 and the other electronic device 300 are connected to the same local network such as a LAN.

Further, the electronic device 100 and the other electronic device 300 may be detected to be close to each other based on an image captured by the imaging unit 150. For example, the detection unit 111 may determine the electronic device 100 and the other electronic device 300 to be close to each other when an image including a marker such as a two-dimensional code indicating the other electronic device 300 is acquired by the imaging unit 150. Further, for example, the detection unit 111 may determine that the electronic device 100 and the other electronic device 300 are close to each other when an image including an appearance of the other electronic device 300 is acquired by the imaging unit 150. The detection unit 111 may execute image analysis for extracting the marker or the appearance of the other electronic device 300 from the captured image or may provide the image including the marker or the appearance of the other electronic device 300 to the transmission unit 112 as device identification information which will be described below.

Further, here, the other electronic device 300 may include a first part which realizes the association operation with the electronic device 100, and a second part in which device identification information of the other electronic device 300 is described. For example, the other electronic device 300 may be installed in a place that is difficult for a user to approach, like a digital camera installed in the top of a tower. In such a case, an object in which the device identification information of the digital camera is described (e.g., a communication terminal having an NFC module built therein or a display board having a marker such as a two-dimensional code described therein) may be installed in a place that is easy for the user to approach and which is physically separate from the digital camera performing the association operation with the electronic device 100 (e.g., a smartphone of a user). In such a case, the object in which the device identification information is described constitutes the other electronic device 300 according to this embodiment together with the digital camera. Further, the detection unit 111 of the electronic device 100 detects the other electronic device 300 when the second part of the other electronic device 300 approaches the electronic device 100.

The transmission unit 112 transmits device identification information of the electronic device 100 and the other electronic device 300 to the script server 200 over the network. The device identification information is information for identifying the electronic device 100 and the other electronic device 300 which are targets of the association operation when an association operation script which will be described below is prepared in the script server.

Here, the transmission unit 112 may acquire the device identification information of the electronic device 100, for example, from setting information stored in the storage unit 130. On the other hand, the device identification information of the other electronic device 300 may be acquired, for example, from the detection unit 111. For example, when the detection unit 111 detects the other electronic device 300 by executing short distance communication between the electronic device 100 and the other electronic device 300, the device identification information of the other electronic device 300 may be received from the other electronic device 300 through the short distance communication.

Further, when the detection unit 111 detects the other electronic device 300 based on real positions of the electronic device 100 and the other electronic device 300, the device identification information of the other electronic device 300 may be provided, for example, to the detection unit 111 together with positional information of the other electronic device 300 over the network. When the detection unit 111 detects the other electronic device 300 based on the positions on the network of the electronic device 100 and the other electronic device 300, the device identification information can be directly provided from the other electronic device 300 connected to the same local network.

Further, when the detection unit 111 detects the other electronic device 300 based on the captured image, the device identification information of the other electronic device 300 may be acquired based on the marker or the appearance of the other electronic device 300 extracted from the captured image through image analysis executed by the detection unit 111. For example, the detection unit 111 may search for the device identification information corresponding to the marker or the appearance from a database on the storage unit 130 or the network. Alternatively, the detection unit 111 may provide a captured image which is likely to include the marker or the appearance to the transmission unit 112 as the device identification information. In this case, the image analysis may be executed in the script server 200 and information such as a model number may be identified.

The reception unit 113 receives association operation scripts for the electronic device 100 and the other electronic device 300 from the script server 200 over the network. The reception unit 113 provides the received association operation scripts to the control unit 114. The association operation script is an example of an association operation program which realizes the association operation between the electronic device 100 and the other electronic device 300 by being executed by the processor 110 of the electronic device 100 and a processor of the other electronic device 300. The association operation script for the electronic device 100 and the association operation script for the other electronic device 300 may be different from each other, and a code for the electronic device 100 and a code for the other electronic device 300 may be included in a common association operation script. Further, the association operation script will be described below in detail. The reception unit 113 may receive a plurality of the association operation scripts which realize different association operations from the script server 200 and directly provide the association operation scripts to the control unit 114. In this case, the control unit 114 selects the association operation script to be executed according to any criterion.

Further, the reception unit 113 may receive information related to the association operation realized by the association operation script, e.g., a manual which explains a procedure fir realizing the association operation, an image of logos indicating devices, association operation scripts or providers therefor, an advertisement, or the like together with the association operation scripts from the script server 200. The received related information may be output, for example, as an image, a sound or the like to a user through the input/output unit 140. Further, the reception unit 113 may receive a script for updating or invalidating the association operation script which has already been received and stored in the storage unit 130, from the script server 200. Further, such an additional script will be described below in detail.

The control unit 114 controls the electronic device 100 according to the association operation script provided from the reception unit 113 to realize the association operation with the other electronic device 300. Here, the other electronic device 300 may be, for example, connected to the network common to the electronic device 100, the script server 200 and the other electronic device 300 and separately receive the association operation script from the script server 200. In this case, the control unit 114 only controls the electronic device 100 according to the association operation script for the electronic device 100. On the other hand, when the other electronic device 300 can communicate with the electronic device 100 but it is difficult for the other electronic device 300 to communicate with the script server 200, the control unit 114 acquires the respective association operation scripts of the electronic device 100 and the other electronic device 300 through the reception unit 113 and transmits the association operation script for the other electronic device 300 among the association operation scripts to the other electronic device 300 through the communication unit 120.

Further, when a plurality of the association operation scripts which realize different association operations are provided from the reception unit 113, the control unit 114 controls the electronic device 100 according to any association operation script selected according to any criterion. For example, the control unit 114 may present the plurality of association operations to the user through a display included in the input/output unit 140, and select the association operation script to be executed according to a user manipulation acquired through the input/output unit 140.

Further, the control unit 114 may cooperate with the storage unit 130. The control unit 114, for example, may at least temporarily store, in the storage unit 130, the association operation script which is provided from the reception unit 113 and used for control of the electronic device 100 for an association operation with the other electronic device 300. Accordingly, for example, in a chance of the association operation with the other electronic device 300 at the next time or a subsequent time, the control unit 114 may control the electronic device 100 according to the association operation script stored in the storage unit 130 in place of the association operation script received from the script server 200 by the reception unit 113, and realize the association operation with the other electronic device 300. The association operation program and the device identification information of the other electronic device 300 are stored to be associated with each other in the storage unit 130. Further, the association operation script for the other electronic device 300 with which the association operation is highly likely to be executed, for example, may be stored in the storage unit 130 in advance. In this case, the control unit 114 searches for the association operation script stored in the storage unit 130 using the device identification information of the other electronic device 300 at a time point at which the detection unit 111 acquires the device identification information of the other electronic device 300, and controls the electronic device 100 according to the association operation script when the association operation scripts for the electronic device 100 and the other electronic device 300 are stored.

Further, even when the association operation scripts are stored in the storage unit 130, exchange with the script server 200 using the transmission unit 112 and the reception unit 113 may be executed, for example, in order to confirm whether there is a script indicating update of the association operation script, or the like. For example, when there is update of the association operation script, the control unit 114 stores an additional script received by the reception unit 113 in the storage unit 130, ends the association operation which is being executed at that time, and then updates the association operation script based on the additional script. Further, when an additional script for invalidating the association operation script is received by the reception unit 113, the control unit 114 may stop the association operation and invalidate or discard the association operation script stored in the storage unit 130 based on the additional script.

Further, the control unit 114 may acquire a log related to the association operation between the electronic device 100 and the other electronic device 300 realized by control according to the association operation script, and at least temporarily store the log in the storage unit 130. The control unit 114 may transmit the acquired log to the script server 200) through the transmission unit 112 in real time or after the fact. The log provided from the electronic device 100 to the script server 200 by the functionality of the control unit 114 may be, for example, information simply indicating that the association operation between the electronic device 100 and the other electronic device 300 has been executed according to the association operation scripts provided by the script server 200 or may be information which describes content of the association operation, such as data exchanged between the devices by the association operation.

(Script Server)

The script server 200 is a server on the network, and provides service to one or a plurality of electronic devices 100. The functionality of the script server 200 may be realized, for example, by a single server device connected to the network. Alternatively, the functionality of the script server 200 may be distributed to a plurality of server devices and realized. In this case, the plurality of server devices cooperate over the network. As described above, the script server 200 can communicate with the electronic device 100 over the network. Further, the script server 200 may directly communicate with the other electronic device 300 over the network or may communicate with the other electronic device 300 only indirectly through the electronic device 100.

Here, the electronic device 100 and the other electronic device 300 may be symmetrical in provision of the service by the script server 200. In other words, the association operation script may be provided by a request including the device identification information being transmitted from the electronic device 100 sometimes, and the association operation script may be provided by the same request being transmitted from the other electronic device 300 at other times. Alternatively, the electronic device 100 and the other electronic device 300 may be asymmetrical in provision of the service. In other words, only the electronic device 100 may transmit the request including the device identification information, and the association operation script may be provided to the other electronic device 300 only when the request is transmitted from the electronic device 100.

The script server 200 includes a processor 210, a communication unit 220 and a storage unit 230. In a hardware configuration example, the processor 210 may be realized by a CPU, a ROM, a RAM and the like. The communication unit 220 may be realized by a communication device. The storage unit 130 may be realized, for example, by a storage device and/or a removable storage medium.

The processor 210 may realize functionalities of the reception unit 211, the detection unit 212, a program acquisition unit 213 and the transmission unit 214 by operating according to a program. Further, the processor 210 may realize various functionalities for the entire control of the script server 200, but the functionalities are well known to a person skilled in the art. Therefore, a description of the functionalities is omitted herein. Hereinafter, the respective functionalities will be further described The reception unit 211 receives the device identification information of the electronic device 100 from the electronic device 100 over the network. The reception unit 211 may also receive the device identification information of the other electronic device 300 from the electronic device 100. The reception unit 211 provides the received device identification information to the program acquisition unit 213. As described above, the device identification information may include, for example, information such as a model number of the device. Further, for example, when the other electronic device 300 is detected based on the captured image in the electronic device 100, the device identification information may be a captured image which is likely to include the marker such as a two-dimensional code indicating the other electronic device 300 or the appearance of the other electronic device 300. In this case, the reception unit 211 provides the captured image to the program acquisition unit 213, and the image analysis is executed by the program acquisition unit 213 such that information such as a model number can be identified.

Further, the reception unit 211 may acquire the log related to the association operation between the electronic device 100 and the other electronic device 300 which has been acquired by the control unit 114 in the electronic device 100. As described above, the log may be, for example, information simply indicating that the association operation with the other electronic device 300 has been executed in the electronic device 100 under control according to the association operation scripts provided from the script server 200 or may be information which describes content of the association operation, such as data exchanged between the devices in the association operation. The received log may be at least temporarily stored in the storage unit 230 and referenced, for example, by the program acquisition unit 213 or may be referenced by other functionalities (not illustrated) of the script server 200, such as billing, or by another server.

The detection unit 212 detects at least one other electronic device 300. As described above, the other electronic device 300 is a device which is a target of the association operation of the electronic device 100. The other electronic device 300 may be detected by the detection unit 111 of the electronic device 100. Therewith or alternatively, the other electronic device 300 may be detected by the detection unit 212 of the script server 200. For example, when the electronic device 100 and the other electronic device 300 are detected to be close to each other based on real positions of the respective devices detected by the GPS or the like, or the electronic device 100 and the other electronic device 300 are detected to be close to each other based on positions on the network recognized from the respective communication statuses, the detection unit 212 of the script server 200 communicating with the electronic device 100 and the other electronic device 300 over the network may also detect that these devices are close to each other.

The program acquisition unit 213 acquires the association operation scripts for the electronic device 100 and the other electronic device 300. While the program acquisition unit 213 acquires the association operation scripts from the storage unit 230 in an illustrated example, the program acquisition unit 213 may acquire the association operation scripts from another server on the network in other examples. The association operation scripts, for example, are stored in the storage unit 230 or the other server to be associated with the respective device identification information of the electronic device 100 and the other electronic device 300, and the program acquisition unit 213 may search for the association operation scripts using the device identification information. The association operation script is an example of the association operation program which realizes the association operation between the electronic device 100 and the other electronic device 300 by being executed by the processor 110 of the electronic device 100 and a processor of the other electronic device 300, as described above.

Here, the program acquisition unit 213 may acquire a plurality of the association operation scripts which realize different association operations from the storage unit 230 or the other server. In this case, the plurality of the association operation scripts may be directly transmitted to the electronic device 100 by the transmission unit 214, and the association operation script to be executed may be selected in the electronic device 100. Alternatively, the program acquisition unit 213, for example, may select an association operation script which realizes the association operation that is highly likely to be executed based on a log of a past association operation (provided by the electronic device 100) stored in the storage unit 230, and provide one or a plurality of selected association operation scripts to the electronic device 100 through the transmission unit 214.

Further, the program acquisition unit 213 may acquire information related to the association operation realized by the association operation script, e.g., a manual which explains a procedure for realizing the association operation, an image of logos indicating devices, association operation scripts or providers therefor, an advertisement, or the like together with the association operation scripts. The acquired related information is provided to the electronic device 100 through the transmission unit 214 together with the association operation script. Further, the program acquisition unit 213 may acquire an additional script for updating or invalidating the association operation script which has already been stored in the storage unit 130 of the electronic device 100, from the storage unit 230 or another server.

The transmission unit 214 transmits the association operation scripts for the electronic device 100 and the other electronic device 300 to the electronic device 100 over the network. The transmission unit 214 may also transmit the association operation script to the other electronic device 300. For example, when the electronic device 100 and the other electronic device 300 are both connected to the network common to the electronic device 100, the other electronic device 300 and the script server 200, the transmission unit 214 may transmit the association operation script to both of the electronic device 100 and the other electronic device 300. On the other hand, when the other electronic device 300 is not capable of directly communicating with the script server 200, the transmission unit 214 may transmit the association operation scripts for both of the electronic device 100 and the other electronic device 300 to the electronic device 100 in order for the association operation script to be transferred from the electronic device 100 to the other electronic device 300. Further, the transmission unit 214 may transmit information related to the association operation acquired by the program acquisition unit 213 to the electronic device 100 and/or the other electronic device 300. Further, the transmission unit 214 may transmit an additional script for updating or invalidating the association operation script which has already been stored in the electronic device 100 or the other electronic device 300, to the electronic device 100 or the other electronic device 300.

(1-2. Process Flow)

FIG. 2 is flowchart illustrating an example of a process of the electronic device according to one embodiment of this disclosure. In the example illustrated in FIG. 2, first, the detection unit 111 of the electronic device 100 detects the other electronic device 300 (step S101). Here, the detection of the other electronic device 300 can be executed, for example, based on the short distance communication, the positional information, or the captured image, as described above. The detection unit 111 provides device identification information of the detected other electronic device 300 to the control unit 114.

When the other electronic device 300 is detected in step S101, the control unit 114 determines whether the association operation script for an association operation with the detected other electronic device 300 has already been stored (cached) in the storage unit 130 (step S103). Here, the control unit 114 may search for the association operation script stored in the storage unit 130 using the device identification information of the other electronic device 300 provided from the detection unit 111, as described above.

When the association operation script has been cached in step S103, the control unit 114 reads the association operation script and controls the electronic device 100 according to the association operation script to realize the association operation with the other electronic device 300 (step S109). On the other hand, when the association operation script has not been cached, the transmission unit 112 transmits a request including the device identification information of the electronic device 100 and the other electronic device 300 to the script server 200 (step S105), and the reception unit 113 receives the association operation script transmitted by the script server 200 in response to the request (step S107). The control unit 114 realizes the association operation with the other electronic device 300 by controlling the electronic device 100 according to the association operation script received here (step S109).

After the association operation ends in step S109, the control unit 114 stores (caches) the used association operation script in the storage unit 130. Accordingly, in the illustrated example, when the same other electronic device 300 is detected at the second time or a subsequent time (step S101), the association operation can quickly start since the association operation script has been cached in the storage unit 130 (step S111).

FIG. 3 is flowchart illustrating an example of a process of the script server according to one embodiment of this disclosure. First, in the example illustrated in FIG. 3, the reception unit 211 of the script server 200 receives a script request including the device identification information of the electronic device 100 from the electronic device 100 (step S201). Here, the script request may be transmitted, for example, in a case in which the other electronic device 300 is detected in the electronic device 100 or a case in which start of the association operation is instructed by a user manipulation in the electronic device 100.

When the script request is received in step S201, the program acquisition unit 213 determines whether an association partner, i.e., the other electronic device 300, has been identified in the script request (step S203). This determination may be a determination as to whether not only the device identification information of the electronic device 100 but also the device identification information of the other electronic device 300 is included in the script request.

When the other electronic device 300 has been identified in the script request in step S203, the program acquisition unit 213 searches for association operation scripts stored in the storage unit 230 or another server using the device identification information of the electronic device 100 and the other electronic device 300, and acquires the association operation scripts for the electronic device 100 and the other electronic device 300 (step S207). On the other hand, when the other electronic device 300 has not been identified in the script request, the detection unit 212 detects the other electronic device 300 which is a device of the association partner of the electronic device 100 (step S205), and the program acquisition unit 213 acquires the association operation script using the device recognition information of the other electronic device 300 provided by the detection unit 212 (step S207).

After the association operation scripts have been acquired in step S207, the transmission unit 214 transmits the association operation scripts to the electronic device 100 (step S209). The transmission unit 214 may transmit the association operation script to the other electronic device 300, as described above.

2. A Mechanism and a Specific Example of the Association Operation

Next, a mechanism and a specific example of the association operation in one embodiment of this disclosure will be described with reference to FIGS. 4 to 8.

2-1. Mechanism of the Association Operation

FIGS. 4 and 5 are diagrams illustrating a functionality of the association operation script in one embodiment of this disclosure. Device APIs (Application Programming Interfaces) 101 and 301, communication functionalities 103 and 303, and other functionalities 105 and 305 for the electronic device 100 and the other electronic device 300 are illustrated in FIGS. 4 and 5. While these elements of the electronic device 100 will be described by way of example hereinafter, the same applies to the other electronic device 300.

The device API 101 is an API prepared to use a functionality of the electronic device 100 and may be realized as software by the processor 110 of the electronic device 100. The communication functionality 103 and the other functionality 105 of the electronic device 100 are abstracted by the device API 101. In other words, for example, when a function defined in the device API 101 is called, the processor 110 issues a control command for controlling the processor 110 itself or hardware such as the communication unit 120, the storage unit 130 and the input/output unit 140 to realize the communication functionality 103 and the other functionality 105.

In a state illustrated in FIG. 4, there is no association operation script in at least the electronic device 100. In this state, the association operation between the electronic device 100 and the other electronic device 300 is difficult. On the other hand, in a state illustrated in FIG. 5, an association operation script 107 is distributed to the electronic device 100 by the script server 200. In the electronic device 100, the communication functionality 103 and the other functionality 105 for an association operation with the other electronic device 300 are realized by the processor 110 calling the function defined in the device API 101 according to the association operation script 107.

On the other hand, an association operation script 307 may also be distributed to the other electronic device 300 by the script server 200, as in the electronic device 100. Alternatively, the association operation script 307 may have been prepared in the other electronic device 300 in advance, as illustrated in FIG. 4. In the other electronic device 300, the communication functionality 303 and the other functionality 305 for an association operation with the electronic device 100 are realized by calling a function defined in the device API 301 according to the association operation script 307. A state in which the communication functionality 103 of the electronic device 100 and the communication functionality 303 of the other electronic device 300 are communicating with each other in the association operation is illustrated in FIG. 5.

Here, the association operation script in this embodiment will be described again. In the present specification, an association operation program described in a script format among association operation programs is referred to as an association operation script. The script format may mean a program described using a script language or an interpreter language. An example of such a language includes a markup language. Further, the association operation program is not limited to a script format and may be described in other formats (e.g., an object code or an assembly language), but when the association operation program is described in a script format, it is advantageous, for example, in that a program development period is shortened.

For example, an entity which executes an operation, a function of a used API, a parameter set in the function, a combination or an order of functions to be executed, and the like are described in the association operation script. For example, in the example illustrated in FIGS. 4 and 5, in the electronic device 100, an interpreter corresponding to the association operation script 107 is implemented in the processor 110, and a function of the device API 101 is called according to interpretation of the association operation script 107 by the interpreter, such that the communication functionality 103 and the other functionality 105 are realized. The same applies to the other electronic device 300.

Thus, in this embodiment, the functionality realized by the hardware of the electronic device is abstracted using the device API, and each functionality is realized through the device API according to a predetermined condition and/or procedure using the association operation script, such that the association operation between the devices is realized. Therefore, it is not necessary to determine conditions or procedures for all association operations at the time of manufacture of the electronic device and write the conditions or the procedures as a program, and it is possible to define the conditions or the procedures using the association operation script after manufacture of the electronic device. Therefore, it is possible to shorten a development period of the electronic device, and easily realize the association operation with a new device appearing after manufacture of the electronic device.

Further, since an association operation script can be provided after the electronic device of the association partner is concretely identified, a case in which information on a large number of association operations, including association operations which are unrealizable, is displayed and confuses the user does not occur. Further, for example, even when electronic devices of association partners are different according to a difference of products circulating in each region, association operations according to the respective regions can be selectively presented and realized without modifying a program design of the electronic devices. Further, as the association script can be updated or invalidated, for example, a posteriori management of a use right of the association operation or distribution of a time-limited, effective association operation script is possible.

2-2. A Specific Example of the Association Operation

First Example: An Image Captured by a Digital Camera is Recorded by a Smartphone FIG. 6 is a diagram illustrating a first specific example of the association operation in one embodiment of this disclosure. In the example illustrated in FIG. 6, a smartphone 100a is illustrated as a specific example of the electronic device 100 and a digital camera 300a is illustrated as a specific example of the other electronic device 300.

In the illustrated example, an association operation script 107a "to receive and record an image" is provided from the script server 200 to the smartphone 100a and an association operation script 307a "to capture and transmit an image" is provided from the script server 200 to the digital camera 300a. The association operation scripts 107a and 307a are scripts for realizing an association operation between the smartphone 100a and the digital camera 300a "to transfer the image captured by the digital camera 300a to the smartphone 100a and record the image on the smartphone 100a." For example, the association operation scripts 107a and 307a may be stored to be associated with device identification information of the smartphone 100a and the digital camera 300a in the script server 200.

The association operation "to transfer the image captured by the digital camera 300a to the smartphone 100a and record the image on the smartphone 100a" may be executed, for example, when photographs are shared between friends visiting the same place or an image of the camera provided to the public (e.g., installed in a restricted area) at a sightseeing spot or an event meeting place is acquired. Therefore, the association operation scripts 107a and 307a may be distributed to the smartphone 100a and the digital camera 300a, for example, when the smartphone 100a and the digital camera 300a have been close to each other and short distance communication has been executed or when an image including a two-dimensional code indicating the digital camera 300a is captured by a camera of the smartphone 100a. More specifically, when a request including the device identification information of the digital camera 300a has been transmitted from the smartphone 100a to the script server 200, the association operation scripts 107a and 307a may be distributed from the script server 200.

Here, the script server 200 may transmit the association operation script 107a to the smartphone 100a and the association operation script 307a to the digital camera 300a. Alternatively, the script server 200 may transmit both of the association operation script 107a and the association operation script 307a to both of the smartphone 100a and the digital camera 300a, the smartphone 100a may selectively execute the association operation script 107a, and the digital camera 300a may selectively execute the association operation script 307a. In this case, the association operation script 107a and the association operation script 307a may be described, for example, in the same file or may be described in separate files.

For example, a function of capturing an image using the imaging functionality 305a and a function of transmitting image data using the communication functionality 303a are defined in the device API 301a of the digital camera 300a. In the digital camera 300a, imaging using the imaging functionality 305a is first executed and then data transmission using the communication functionality 303a is executed for the image data obtained by imaging, as a result of calling the functions according to the association operation script 307a. In this case, the smartphone 100a may be designated as a transmission destination of the image data according to the association operation script 307a.

Meanwhile, a function of receiving the image data using the communication functionality 103a and a function of recording the image data using the recording functionality 105a are defined in the device API 101a of the smartphone 100a. In the smartphone 100a, first, the reception of the image data using the communication functionality 103a is executed and then the received image data is recorded using the recording functionality 105a as a result of such functions are called according to the association operation script 107a. In this case, according to the association operation script 107a, the digital camera 300a may be designated as a transmission source of the image data.

Second Example: Remote Photography

FIG. 7 is a diagram illustrating a second specific example of the association operation in one embodiment of this disclosure. In the example illustrated in FIG. 7, a smartphone 100a is illustrated as a specific example of the electronic device 100, and a digital camera 300a is illustrated as a specific example of the other electronic device 300.

In the illustrated example, an association operation script 107b of "remote photography" is provided from the script server 200 to the smartphone 100a and an association operation script 307b of "remote photography" is provided from the script server 200 to the digital camera 300a. The association operation scripts 107b and 307b are scripts for realizing an association operation between the smartphone 100a and the digital camera 300a "to remotely control the digital camera 300a from the smartphone 100a and execute the photography." The association operation scripts 107b and 307b may be stored, for example, in the script server 200 to be associated with the device identification information of the smartphone 100a and the digital camera 300a, as in the first example. A distribution form of the scripts from the script server 200 to the smartphone 100a and the digital camera 300a is the same as that in the first example described above.

The association operation "to remotely control the digital camera 300a from the smartphone 100a and execute the photography" may be executed in the same situation as in the first example described above. Therefore, the association operation scripts 107b and 307b may be distributed to the smartphone 100a and the digital camera 300a on the same condition as in the first example.

For example, a function of transmitting a control command to an imaging device using a communication functionality 103b different from the communication functionality 103a in the first example and receiving image data from the imaging device is defined in a device API 101a of the smartphone 100a. Further, a function of receiving the control command from the control device using a communication functionality 303b different from the communication functionality 303a in the first example and transmitting the image data to the control device is defined in a device API 301a of the digital camera 300a.

In the second example, first, the communication functionality 103b in the smartphone 100a is executed through the device API 101a by the association operation script 107b. In this case, as the digital camera 300a is designated as an imaging device which is a transmission destination, the control command is transmitted from the smartphone 100a to the digital camera 300a. On the other hand, the communication functionality 303b in the digital camera 300a is executed through the device API 301a by the association operation script 307b. In this case, as the smartphone 100a is designated as a control device which is a transmission source, the control command transmitted from the smartphone 100a is received.

Here, information of the function of the device API 301a of the digital camera 300a designated by the association operation script 107b may be included in the control command. Thus, in this embodiment, using information on a device API of a device of an association partner described in the association operation script, a control command according to the device of the association partner may be issued, for example, in the case of the remote control as in the example described above.

Subsequently, in the digital camera 300a, imaging using an imaging functionality 305a is executed according to the received control command, and image data obtained by the imaging is transmitted to the smartphone 100a using the communication functionality 303b. In the smartphone 100a, the image data is received from the digital camera 300a using the communication functionality 103b, and the received image data is recorded using a recording functionality 105a.

Third Example: Recording During a Call

FIG. 8 is a diagram illustrating a third specific example of the association operation in one embodiment of this disclosure. In the example illustrated in FIG. 8, a smartphone 100a is illustrated as a specific example of the electronic device 100, and a television 300c and a recorder 300d are illustrated as a specific example of the other electronic devices 300.

In the illustrated example, association operation scripts 107c, 307c and 307d of "recording during a call" are provided from the script server 200 to the smartphone 100a, the television 300c and the recorder 300d, respectively. The association operation scripts 107c, 307c and 307d are scripts for realizing an association operation among the smartphone 100a, the television 300c and the recorder 300d "to record content televised by the television 300c on the recorder 300d during a call on the smartphone 100a and reproduce the content after the call." The association operation scripts 107c, 307c and 307d may be stored to be associated with device identification information of the smartphone 100a, the television 300c and the recorder 300d, for example, in the script server 200.

For example, the association operation "to record content televised by the television 300c on the recorder 300d during a call on the smartphone 100a and reproduce the content after the call" may be executed when a user of the smartphone 100a watches the television 300c at home and there is an incoming call on the smartphone 100a. For example, when the smartphone 100a, the television 300c and the recorder 300d are connected to a LAN within the same home, the association operation scripts 107c, 307c and 307d may be distributed from the script server 200 to the respective devices.

Here, since there are a large number of other association operations as association operations of the smartphone 100a and the television 300c and/or the recorder 300d, for example, when the smartphone 100a is connected to the LAN within the home, a plurality of the association operation scripts including the association operation scripts 107c, 307c and 307d may be distributed to the devices. Alternatively, association operation scripts to be distributed may be selected by a user manipulation. A timing at which the association operation is executed by each association operation script may be designated, for example, by a user manipulation or may be automatically determined in conjunction with another operation executed by each device.

In the illustrated example, when the association operation script 107c in the smartphone 100a recognizes that a call using a call functionality 105c starts through the device API 101a, the association operation script 107c starts up a communication functionality 103c through the device API 101a. Using the communication functionality 103c, the television 300c and the recorder 300d are notified that the association operation by the association operation scripts 307c and 307d starts.

In this case, the association operation script 307c in the television 300c acquires information (e.g., a channel of broadcasting waves) on content televised using a display functionality 305c through the device API 301c, and transmits the acquired information using the communication functionality 303c to the recorder 300d.

Meanwhile, in the recorder 300d, the association operation script 307d receives the information transmitted from the television 300c using a communication functionality 303d through the device API 301d and starts recording of the content using a recording functionality 305d.

Then, in the smartphone 100a, the association operation script 107c recognizes that a call using the call functionality 105c ends through the device API 101a. In this case, using the communication functionality 103c, the television 300c and the recorder 300d are notified that a stage of the association operation is shifted from recording to reproduction. In this case, the association operation script 307d in the recorder 300d ends the recording of the content using the recording functionality 305d (when the televising of the content does not end, recording may continue for subsequent time shift reproduction), and provides the recorded content to the television 300c using the communication functionality 303d.

Meanwhile, in the television 300c, the association operation script 307d receives the content transmitted from the recorder 300d using the communication functionality 303c, and televises the received content using the display functionality 305c. This operation of the television 300c, for example, may be an operation of switching a source of the content televised using the display functionality 305c from the broadcasting waves to HDMI (registered trademark) (High-Definition Multimedia Interface). With the association operation described above, the user can watch, on the television 300c, a part of the content missed due to televising during a call after ending the call on the smartphone 100a.

Further, in the illustrated example, the communication functionalities 303c and 303d can execute both of communication through a LAN within a home, including the smartphone 100a, and communication using the HDMI (registered trademark) between the television 300c and the recorder 300d. These communications may be implemented, for example, by separate functions in the device APIs 301c and 301d. Thus, the functionalities described in the respective described examples do not necessarily correspond to the functions defined in the device APIs. The respective functionalities, for example, may be realized by calling a plurality of functions defined in the device APIs according to a predetermined procedure.

As described above, in this embodiment, various association operations by various devices are possible. All association operations realized, for example, by storing procedures for the association operations in the respective devices in advance can be realized as association operations in the system according to this embodiment by preparing device APIs in the respective devices and distributing association operation scripts capable of using the device APIs, as shown in the example described above.

3. Implementation Examples

Next, implementation examples of one embodiment of this disclosure will be described with reference to FIGS. 9 and 10.

3.1. An Implementation Example of Electronic Device

FIG. 9 is a diagram illustrating an implementation example of an electronic device in one embodiment of this disclosure. An electronic device 100 illustrated in FIG. 9 communicates with a script server 200 over a network and transmits or receives various pieces of information to or from a servlet 2130 of the script server 200. Further, among elements to be described below, a parser 1141, a panel state 1143, a script engine 1145, a device API 1147 and an event handler 1149 correspond to, for example, the control unit 114 realized by the processor 110 of the electronic device 100 or a display realized by the control unit 114. A network interface 1120 (or a network interface 1130) corresponds to, for example, the transmission unit 112 and/or the reception unit 113 realized by the processor 110 of the electronic device 100.

Further a local storage 1301 and a repository 1303 correspond to, for example, the storage unit 130 of the electronic device 100. A view 1401 and UI event control 1403 correspond to, for example, the input/output unit 140 of the electronic device 100. Further, elements corresponding to all the components of the electronic device 100 illustrated in FIG. 1 are not necessarily illustrated in FIG. 9.

The parser 1141 parses a script (an association operation script) received from the script server 200. The script may be described, for example, as text using a markup language or the like, but the parser 1141 parses the text and generates, for example, an object model. The generated object model is provided for reading by a user via the view 1401 displayed as the panel state 1143 on the display. A plurality of (parsed) scripts corresponding to association operations executable at present are included in the panel state 1143. For example, when an executable association operation is changed due to a change in a position relationship or a communication status between the electronic device 100 and the other device, the panel state 1143 may be updated with a newly received script. Further, the generated object model may be stored in the local storage 1301.

The UI event control 1403 is control based on an event from a UI (User Interface). For example, the UI event control 1403 provides the script engine 1145 with information based on an input manipulation of the user who has referenced the panel state 1143 via the view 1401. The script engine 1145 determines a script to be executed from among the scripts included in the panel state 1143 based on the input manipulation of the user. Alternatively, the script engine 1145 may read the script to be executed from the local storage 1301.

The script engine 1145 calls the device functionality 1001 through the device API 1147. In this case, for example, data stored in the repository 1303, such as content, may be referenced. The script engine 1145 notifies the script server 200 that the script has been executed. Further, the script engine 1145 may notify the script server 200 of a status of the device API of this time.

Meanwhile, the event handler 1149 receives a notification (local notification) of a state of the realized device functionality 1001 through the device API 1147 and controls the script engine 1145 based on this notification. For example, together with an input manipulation of the user or instead of the input manipulation, a script to be executed by the script engine 1145 may be determined based on the state of the device functionality 1001 acquired by the event handler 1149. Further, the event handler 1149 may receive, for example, the notification of the state of the device of the association partner from the script server 200.

Here, the device functionality 1001 and the repository 1303 are implemented as native functionalities of the electronic device 100, and the device APT 1147 functions as an interface between an OS (Operating System) application, including the script engine 1145 or the event handler 1149, and the native functionalities. Further, functionalities including the parser 1141, the panel state 1143, the view 1401 and the UI event control 1403 described above may be implemented, for example, as a browser application operating on the OS application.

3-2. An Implementation Example of the Script Server

FIG. 10 is a diagram illustrating an implementation example of the script server in one embodiment of this disclosure. The script server 200 illustrated in FIG. 10 communicates with the electronic device 100 over a network and transmits or receives various pieces of information to or from the parser 1141, the script engine 1145 and/or the event handler 1149 of the electronic device 100 described above. Further, among elements to be described below, a servlet 2130 (script control 2131 and API management 2133) corresponds to, for example, the program acquisition unit 213 realized by the processor 210 of the script server 200. A network interface 2110 (or a network interface 2140) corresponds to, for example, the reception unit 211 and/or the transmission unit 214 realized by the processor 210 of the script server 200. Further, a script/API database 2301, an API database 2303 and an API status database 2305 correspond to, for example, the storage unit 230 of the script server 200. Further, elements corresponding to all the components of the script server 200 illustrated in FIG. 1 are not necessarily illustrated in FIG. 10.

The script control 2131 included in the servlet 2130 transmits the script to the parser 1141 of the electronic device 100 based on information stored in a database which will be described below and a status of the device API provided from the APT management 2133. Further, the script control 2131 transmits, for example, a notification of a state of the device of the association partner to the event handler 1149 of the electronic device 100.

Meanwhile, the API management 2133 receives the status of the device API of the electronic device 100 from the script engine 1145 of the electronic device 100. The API management 2133 may execute an inquiry of the status of the device API to the electronic device 100. The API management 2133 registers the received status of the device API in the API status database 2305.

The script/API database 2301 holds device APIs, and scripts to be associated with the related device APIs. Since the device APIs are different according to the respective electronic devices 100, information such as IDs for identifying the device APIs may be used as device identification information. Therefore, in this implementation example, the script control 2131 can search for the script from the script/API database 2301 based on the status of the device API 1147 of the electronic device 100 (including a status of a device API of another related device) acquired through the API management 2133.

The API database 2303 holds information on the device APIs. For example, update of the device API may be managed in the API database 2303. The status of the individual device API (e.g., identified by the ID) in the electronic device 100 (e.g., a default status, a status of the device, a status of the user, ad hoc, and a status of a connection with another device API) is registered in the API status database 2305. For example, the script control 2131 may acquire the status of an individual device API related to the association operation from the API status database 2305 when referring to the script/API database 2301.

3-3. An Implementation Example of the Association Operation Script

Hereinafter, two implementation examples of the association operation script which is an example of the association operation program according to one embodiment of this disclosure are shown.

First Implementation Example

A first implementation example is a script corresponding to the first specific example described above, i.e., an example in which the image captured by the digital camera is recorded on the smartphone.

In the following example, SDN is a name given to a format of the script, and has no meaning in and of itself. Action means an individual element of the association operation. FeatureAction is a type of action corresponding to the entire association operation realized by a series of operations, like share of the captured image in this example. Meanwhile, CoreAction is a basic action which is appropriately called to realize FeatureAction. Device means an abstracted device. SelfDevice is a name given to the electronic device 100 in the above-described example, and NeighborDevice is a name given to the other electronic device 300 in the above-described example. Further, the process described in the script does not necessarily strictly correspond to the first specific example described above.

```
 1  <?xml version="1.0" encoding="utf-8"?>
 2  <SDN version="1.0">
 3    <Action type="FeatureAction" name="CaptureAndShare">
 4      <Action type="CoreAction" name="AdhocSession">
 5        <Source type="Device" name="SelfDevice" />
 6        <Target type="Device" name="NeighborDevice" />
 7        <Connect type="DeviceAPI" name="Device" function=
             "AdhocSession" />
 8      </Action>
 9      <Action type="CoreAction" name="ReceiveShot">
10        <Source type="Device" name="SelfDevice" />
11        <Target type="Device" name="NeighborDevice" />
12        <Connect type="DeviceAPI" name="Device" function=
             "ReceiveShot" />
13      </Action>
14    </Action>
15  </SDN>
```

Second Implementation Example

A second implementation example is a script corresponding to the second specific example described above, i.e., the example of remote photography. Further, the terms of scripts are the same as those in the first implementation example described above. Further, the process described in the script does not necessarily strictly correspond to the second specific example described above.

```
 1  <?xml version="1.0" encoding="utf-8"?>
 2  <SDN version="1.0">
 3    <Action type="FeatureAction" name="RemoteShooting">
 4      <Action type="CoreAction" name="AdhocSession">
 5        <Source type="Device" name="SelfDevice" />
 6        <Target type="Device" name="NeighborDevice" />
 7        <Connect type="DeviceAPI" name="Device" function=
             "AdhocSession" />
 8      </Action>
 9      <Action type="CoreAction" name="ShootAndStore">
10        <Source type="Device" name="SelfDevice" />
11        <Target type="Device" name="NeighborDevice" />
12        <Connect type="DeviceAPI" name="Device" function=
             "ShootAndStore" />
13      </Action>
14    </Action>
15  </SDN>
```

4. Hardware Configuration

Next, a hardware configuration of an information processing device according to the embodiment of this disclosure will be described with reference to FIG. 11. FIG. 11 is a block diagram illustrating a hardware configuration of the information processing device according to the embodiment of this disclosure. The illustrated information processing device 900, for example, may realize the electronic device 100, the script server 200 or the other electronic device 300 in the embodiment described above.

The information processing apparatus 900 includes a CPU (Central Processing Unit) 901, a ROM (Read Only Memory) 903, and a RAM (Random Access Memory) 905. In addition, the information processing apparatus 900 may include a host bus 907, a bridge 909, an external bus 911, an interface 913, an input device 915, an output device 917, a storage device 919, a drive 921, a connection port 923, and a communication device 925. Further, the information processing apparatus 900 may include an imaging device 933 and a sensor 935 as necessary. The information processing apparatus 900 may include a processing circuit such as a DSP (Digital Signal Processor), alternatively or in addition to the CPU 901.

The CPU 901 serves as an operation processor and a controller, and controls all or some operations in the information processing apparatus 900 in accordance with various programs recorded in the ROM 903, the RAM 905, the storage device 919 or a removable recording medium 927. The ROM 903 stores programs and operation parameters which are used by the CPU 901. The RAM 905 primarily stores program which are used in the execution of the CPU 901 and parameters which is appropriately modified in the execution. The CPU 901, ROM 903, and RAM 905 are connected to each other by the host bus 907 configured to include an internal bus such as a CPU bus. In addition, the host bus 907 is connected to the external bus 911 such as a PCI (Peripheral Component Interconnect/Interface) bus via the bridge 909.

The input device 915 may be a device which is operated by a user, such as a mouse, a keyboard, a touch panel, buttons, switches and a lever. The input device 915 may be, for example, a remote control unit using infrared light or other radio waves, or may be an external connection device 929 such as a portable phone operable in response to the operation of the information processing apparatus 900. Furthermore, the input device 915 includes an input control circuit which generates an input signal on the basis of the information which is input by a user and outputs the input signal to the CPU 901. By operating the input device 915, a user can input various types of data to the information processing apparatus 900 or issue instructions for causing the information processing apparatus 900 to perform a processing operation.

The output device 917 includes a device capable of visually or audibly notifying the user of acquired information. The output device 917 may include a display device such as LCD (Liquid Crystal Display), PDP (Plasma Display Panel), and organic EL (Electro-Luminescence) displays, an audio output device such as speaker and headphone, and a peripheral device such as printer. The output device 917 may output the results obtained from the process of the information processing apparatus 900 in a form of a video such as text or image, and an audio such as voice or sound.

The storage device 919 is a device for data storage which is configured as an example of a storage unit of the information processing apparatus 900. The storage device 919 includes, for example, a magnetic storage device such as HDD (Hard Disk Drive), a semiconductor storage device, an optical storage device, or a magneto-optical storage device. The storage device 919 stores programs to be executed by the CPU 901, various data, and data obtained from the outside.

The drive 921 is a reader/writer for the removable recording medium 927 such as a magnetic disk, an optical disk, a magneto-optical disk, or a semiconductor memory, and is embedded in the information processing apparatus 900 or attached externally thereto. The drive 921 reads information recorded in the removable recording medium 927 attached thereto, and outputs the read information to the RAM 905. Further, the drive 921 can write in the removable recording medium 927 attached thereto.

The connection port 923 is a port used to directly connect devices to the information processing apparatus 900. The connection port 923 may include a USB (Universal Serial Bus) port, an IEEE1394 port, and a SCSI (Small Computer System Interface) port. The connection port 923 may further include an RS-232C port, an optical audio terminal, an HDMI (High-Definition Multimedia Interface) port, and so on. The connection of the external connection device 929 to the connection port 923 makes it possible to exchange various data between the information processing apparatus 900 and the external connection device 929.

The communication device 925 is, for example, a communication interface including a communication device or the like for connection to a communication network 931. The communication device 925 may be, for example, a communication card for a wired or wireless LAN (Local Area Network), Bluetooth (registered trademark), WUSB (Wireless USB) or the like. In addition, the communication device 925 may be a router for optical communication, a router for ADSL (Asymmetric Digital Subscriber Line), a modem for various kinds of communications, or the like. The communication device 925 can transmit and receive signals to and from, for example, the Internet or other communication devices based on a predetermined protocol such as TCP/IP. In addition, the communication network 931 connected to the communication device 925 may be a network or the like connected in a wired or wireless manner, and may be, for example, the Internet, a home LAN, infrared communication, radio wave communication, satellite communication, or the like.

The imaging device 933 is a device that generates an image by imaging a real space using an image sensor such as a charge-coupled device (CCD) or complementary metal-oxide-semiconductor (CMOS) sensor, as well as various members such as one or more lenses for controlling the formation of a subject image on the image sensor, for example. The imaging device 933 may be a device that takes still images, and may also be a device that takes moving images.

The sensor 935 is any of various sensors such as an acceleration sensor, a gyro sensor, a geomagnetic sensor, an optical sensor, or a sound sensor, for example. The sensor 935 acquires information regarding the state of the information processing apparatus 900, such as the orientation of the case of the information processing apparatus 900, as well as information regarding the environment surrounding the information processing apparatus 900, such as the brightness or noise surrounding the information processing apparatus 900, for example. The sensor 935 may also include a Global Positioning System (GPS) sensor that receives GPS signals and measures the latitude, longitude, and altitude of the apparatus.

The foregoing thus illustrates an exemplary hardware configuration of the information processing apparatus 900. Each of the above components may be realized using general-purpose members, but may also be realized in hardware specialized in the function of each component. Such a configuration may also be modified as appropriate according to the technological level at the time of the implementation.

5. Supplemental Remarks

Embodiments of the present disclosure encompass an information processing apparatus (an electronic device or a server) and system as described in the foregoing, an information processing method executed by an information processing apparatus or system, a program for causing an information processing apparatus to function, and a non-transitory computer readable medium storing such a program, for example.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1)
An electronic device connected to a network, including:
a transmission unit which transmits device identification information of the electronic device and at least one other electronic device to a server over the network;
a reception unit which receives association operation programs for the electronic device and the at least one other electronic device from the server over the network; and
a control unit which controls the electronic device according to the association operation program.

(2)
The electronic device according to (1), further including a detection unit which detects the at least one other electronic device.

(3)
The electronic device according to (2), wherein the detection unit detects the at least one other electronic device when the at least one other electronic device is close to the electronic device.

(4)
The electronic device according to (3), wherein the detection unit detects the at least one other electronic device by executing short distance communication with the at least one other electronic device.

(5)
The electronic device according to (3), wherein the detection unit detects the at least one other electronic device based on real positional information or positional information on the network of the at least one other electronic device.

(6)
The electronic device according to (3), wherein the detection unit detects the at least one other electronic device based on a captured image including the at least one other electronic device.

(7)
The electronic device according to any one of (3) to (6), wherein the at least one other electronic device includes a first part which realizes an association operation with the electronic device, and a second part in which the device identification information is described, and
wherein the detection unit detects the at least one other electronic device when the second part is close to the electronic device.

(8)
The electronic device according to any one of (1) to (7), wherein the reception unit receives a plurality of association operation programs realizing different association operations for the electronic device and the at least one other electronic device, and
wherein the control unit controls the electronic device according to any one of the plurality of association operation programs.

(9)
The electronic device according to (8), wherein the control unit selects any one of the plurality of association operation programs according to a user manipulation.

(10)
The electronic device according to any one of (1) to (9), further including a storage unit in which the association operation program is at least temporarily stored,
wherein the control unit controls the electronic device according to the stored association operation program in place of the received association operation program when the association operation program is stored in the storage unit.

(11)

The electronic device according to (10), wherein the control unit at least temporarily stores the association operation program used for control of the electronic device in the storage unit.

(12)

The electronic device according to (10) or (11),
wherein the association operation program and device identification information of the at least one other electronic device are stored to be associated with each other in the storage unit, and
wherein the control unit determines whether the association operation program is stored in the storage unit by referencing the device identification information of the at least one other electronic device.

(13)

The electronic device according to any one of (10) to (12), wherein the reception unit receives an additional program for updating or invalidating the association operation program stored in the storage unit from the server over the network.

(14)

The electronic device according to any one of (1) to (13), wherein the reception unit receives information related to an association operation realized by the association operation program from the server over the network.

(15)

The electronic device according to any one of 1) to (14), wherein the control unit acquires a log related to an association operation realized by the association operation program, and
wherein the transmission unit transmits the log to the server over the network.

(16)

The electronic device according to any one of (1) to (15), wherein the association operation program is described in a script format.

(17)

A server including:
a reception unit which receives device identification information of a first electronic device from the first electronic device over a network;
a program acquisition unit which acquires association operation programs for the first electronic device and at least one second electronic device different from the first electronic device; and
a transmission unit which transmits the association operation programs to the first electronic device over the network.

(18)

The server according to (17), wherein the reception unit also receives device identification information of the at least one second electronic device from the first electronic device over the network.

(19)

The server according to (17), further including a detection unit which detects the at least one second electronic device.

(20)

The server according to (19), wherein the detection unit detects the at least one second electronic device based on real positional information or positional information on the network of the first electronic device and the at least one second electronic device.

(21)

The server according to any one of (17) to (20), wherein the transmission unit transmits the association operation program to the at least one second electronic device over the network.

(22)

The server according to any one of (17) to (21),
wherein the program acquisition unit acquires a plurality of association operation programs realizing different association operations for the first electronic device and the at least one second electronic device, and
wherein the transmission unit transmits the plurality of association operation programs to the first electronic device over the network.

(23)

The server according to any one of (17) to (22),
wherein the program acquisition unit acquires an additional program for updating or invalidating the association operation program transmitted to the first electronic device, and
wherein the transmission unit transmits the additional program to the first electronic device over the network.

(24)

The server according to any one of (17) to (23),
wherein the program acquisition unit acquires information related to an association operation realized by the association operation program, and
wherein the transmission unit transmits the information related to the association operation to the first electronic device over the network.

(25)

The server according to any one of (17) to (24), wherein the reception unit receives a log related to an association operation realized by the association operation program from the first electronic device over the network.

(26)

The server according to any one of (17) to (25), wherein the association operation program is described in a script format.

(27)

A method of controlling an electronic device connected to a network, the method including:
transmitting device identification information of the electronic device and at least one other electronic device to a server over the network;
receiving association operation programs for the electronic device and the at least one other electronic device from the server over the network; and
controlling, by a processor, the electronic device according to the association operation program.

(28)

An information processing method, including:
receiving device identification information of a first electronic device from the first electronic device over a network;
acquiring, by a processor, association operation programs for the first electronic device and at least one second electronic device different from the first electronic device; and
transmitting the association operation programs to the first electronic device over the network.

(29)

A non-transitory computer-readable recording medium having a program recorded thereon to cause a processor included in an electronic device connected to a network to realize functionalities of:
transmitting device identification information of the electronic device and at least one other electronic device to a server over the network;
receiving association operation programs for the electronic device and the at least one other electronic device from the server over the network; and
controlling the electronic device according to the association operation program.

(30)

A non-transitory computer-readable recording medium having a program recorded thereon to cause a processor included in one or a plurality of information processing devices constituting a server to realize functionalities of:
receiving device identification information of a first electronic device from the first electronic device over a network;
acquiring association operation programs for the first electronic device and at least one second electronic device different from the first electronic device; and
transmitting the association operation programs to the first electronic device over the network.

REFERENCE SIGNS LIST 10 system
100 electronic device
110 processor
111 detection unit
112 transmission unit
113 reception unit
114 control unit
120 communication unit
130 storage unit
200 script server
210 processor
211 reception unit
212 detection unit
213 program acquisition unit
214 transmission unit
220 communication unit
230 storage unit
300 other electronic device

The invention claimed is:

1. An information processing device, comprising:
   circuitry configured to:
   receive description information, associated with a first electronic device and a second electronic device, from the first electronic device;
   identify an association operation program for the first electronic device and the second electronic device based on the received description information; and
   transmit, the identified association operation program and information related to the identified association operation program, to the first electronic device in order to facilitate a first association operation between the first electronic device and the second electronic device,
   wherein the information indicates invalidation of a second association operation stored in the first electronic device.

2. The information processing device according to claim 1, wherein a release date of the identified association operation program is after a release date of at least one of the first electronic device or the second electronic device.

3. The information processing device according to claim 1, wherein the identified association operation program is associated with the first electronic device and the second electronic device.

4. The information processing device according to claim 1, wherein the identified association operation program is associated with at least one of a device type, an application programming interface (API) version, device identification information, or a device model type of each of the first electronic device and the second electronic device.

5. The information processing device according to claim 1, wherein the description information includes an image of the first electronic device, and
the circuitry is further configured to determine an identification of the second electronic device based on the image.

6. The information processing device according to claim 1, further comprising the first electronic device.

7. The information processing device according to claim 1, wherein
the circuitry is further configured to transmit an additional program to the first electronic device, and
the first electronic device ends the first association operation with the second electronic device based on the additional program.

8. The information processing device according to claim 1, wherein
the first electronic device implements a specific function associated with the identified association operation program, based on an execution of a device application programming interface (API) in the first electronic device, and
the execution of the device API is based on the identified association operation program.

9. The information processing device according to claim 1, wherein the circuitry is further configured to:
detect the first electronic device; and
establish communication with the first electronic device based on the detection of the first electronic device.

10. The information processing device according to claim 9, wherein the circuitry is further configured to control the detection of the first electronic device.

11. The information processing device according to claim 1, wherein the circuitry is further configured to transmit, via the first electronic device, at least a portion of the identified association operation program to the second electronic device.

12. The information processing device according to claim 1, wherein the circuitry is further configured to select the identified association operation program based on a user input.

13. The information processing device according to claim 1, wherein the identified association operation program is a script.

14. A first electronic device, comprising:
   circuitry configured to:
   transmit description information to a server,
   receive an association operation program from the server and first information related to the received association operation program based on the transmitted description information; and
   cause a first association operation between the first electronic device and a second electronic device based on the received association operation program and the first information related to the received association operation program,
   wherein the first information indicates invalidation of a second association operation stored in the first electronic device.

15. The first electronic device according to claim 14, wherein a release date of the received association operation program is after a release date of at least one of the first electronic device or the second electronic device.

16. The first electronic device according to claim 14, wherein the received association operation program is associated with at least one of a device type, an application programming interface (API) version, or a device model type of each of the first electronic device and the second electronic device.

17. The first electronic device according to claim 14, wherein
the circuitry is further configured to detect that the second electronic device is within a communication range, and
the communication range corresponds to a distance between the first electronic device and the second electronic device.

18. The first electronic device according to claim 14, wherein the circuitry is further configured to determine an identification of the second electronic device based on an image of the second electronic device.

19. The first electronic device according to claim 18, wherein the circuitry is further configured to:
transmit the image to the server; and
receive identification information of the second electronic device based on the transmitted image.

20. The first electronic device according to claim 14, wherein the circuitry is further configured to:
parse a first portion of the received association operation program for the first electronic device from a second portion of the received association operation program for the second electronic device; and
transmit the second portion to the second electronic device based on the parse of the first portion.

21. The first electronic device according to claim 14, wherein the circuitry is further configured to:
store the received association operation program in a storage device; and
retrieve the received association operation program from the storage device based on an interaction with the second electronic device.

22. The first electronic device according to claim 21, wherein
the circuitry is further configured to store a log of a plurality of past association operations in the storage device, and
the log of the plurality of past association operations comprises at least one of the plurality of past association operations between the first electronic device and the second electronic device, or second information corresponding to data exchanged in the plurality of past association operations between the first electronic device and the second electronic device.

23. The first electronic device according to claim 14, wherein the circuitry is configured to:
execute the received association operation program;
execute a device application programming interface (API) based on the execution of the received association operation program; and
implement a specific function associated with the received association operation program based on the execution of the device API.

24. The first electronic device according to claim 14, wherein the received association operation program is a script.

25. A system, comprising:
a server that includes processing circuitry, wherein the processing circuitry is configured to:
receive description information, associated with a first electronic device and a second electronic device, from the first electronic device;
identify an association operation program for the first electronic device and the second electronic device based on the received description information; and
transmit, the identified association operation program and information related to the identified association operation program, to the first electronic device in order to facilitate a first association operation between the first electronic device and the second electronic device,
wherein the information indicates invalidation of a second association operation stored in the first electronic device; and
the first electronic device configured to communicate with the server and the second electronic device, wherein the first electronic device comprises device circuitry configured to:
transmit the description information to the server; and
receive the association operation program from the server and the information related to the received association operation program based on the transmitted description information.

26. The system according to claim 25, wherein the processing circuitry is further configured to:
receive identification information from the first electronic device and the second electronic device; and
select the association operation program from a plurality of association operation programs based on the received identification information.

27. The system according to claim 25, wherein
the second electronic device includes the server, and
a release date of the second electronic device is after a release date of the first electronic device.

28. The system according to claim 25, wherein the association operation program is a script.

29. A method, comprising:
in an information processing device that includes circuitry:
receiving, by the circuitry, description information associated with a first electronic device and a second electronic device;
identifying, by the circuitry, an association operation program for the first electronic device and the second electronic device based on the received description information; and
transmitting, by the circuitry, the identified association operation program and information related to the identified association operation program to the first electronic device in order to facilitate a first association operation between the first electronic device and the second electronic device,
wherein the information indicates invalidation of a second association operation stored in the first electronic device.

30. A non-transitory computer-readable medium having stored thereon computer-executable instructions that, when executed by a computer, cause the computer to execute operations, the operations comprising:
receiving description information associated with a first electronic device and a second electronic device;
identifying an association operation program for the first electronic device and the second electronic device based on the received description information; and
transmitting the identified association operation program and information related to the identified association operation program to the first electronic device in order to facilitate a first association operation between the first electronic device and the second electronic device, wherein the information indicates invalidation of a second association operation stored in the first electronic device.

* * * * *